United States Patent [19]
Ohtsuka et al.

[11] Patent Number: 5,622,633
[45] Date of Patent: Apr. 22, 1997

[54] SEMICONDUCTOR SENSOR WITH SUSPENDED MICROSTRUCTURE AND METHOD FOR FABRICATING SAME

[75] Inventors: Yoshinori Ohtsuka, Okazaki; Yukihiro Takeuchi, Nishikamo-gun; Tadashi Hattori, Okazaki, all of Japan

[73] Assignee: Nippondenso Co., Ltd., Kariya, Japan

[21] Appl. No.: 516,414

[22] Filed: Aug. 17, 1995

[30] Foreign Application Priority Data

Aug. 18, 1994 [JP] Japan .................................. 6-194395
Apr. 18, 1995 [JP] Japan .................................. 7-092740
Jun. 29, 1995 [JP] Japan .................................. 7-164172

[51] Int. Cl.$^6$ .............................. H01L 21/00; B44C 1/22
[52] U.S. Cl. ................................. 438/53; 216/79; 438/585; 438/739
[58] Field of Search ................ 156/643.1, 647.1, 156/653.1, 657.1, 659.11, 662.1; 216/2, 41, 62, 67, 79; 73/517, 517 R, 517 B; 437/228 SEN, 927

[56] References Cited

U.S. PATENT DOCUMENTS

| | | |
|---|---|---|
| 4,948,757 | 8/1990 | Jain et al. .............................. 216/2 X |
| 5,326,726 | 7/1994 | Tsang et al. . |
| 5,345,824 | 9/1994 | Sherman et al. . |
| 5,470,797 | 11/1995 | Mastrangelo ....................... 437/927 X |

FOREIGN PATENT DOCUMENTS

| | | |
|---|---|---|
| 2134570 | 5/1990 | Japan . |
| 425764 | 1/1992 | Japan . |
| 4504003 | 7/1992 | Japan . |

*Primary Examiner*—William Powell
*Attorney, Agent, or Firm*—Cushman, Darby & Cushman IP Group of Pillsbury Madison & Sutro LLP

[57] ABSTRACT

An MISFET type semiconductor sensor, which can avoid deterioration of characteristics, and a method for fabricating same are disclosed. Silicon oxide films and a silicon nitride film are formed on an upper surface of a p-type silicon substrate, and a movable portion is disposed above the silicon nitride film with a predetermined interval interposed therebetween. A movable gate electrode portion exists on a portion of the movable portion and is displaced by acceleration. Fixed electrodes (a source/drain portion) composed of an impurity diffusion layer are formed on the p-type silicon substrate, and a flowing current changes due to a change in a relative position with the movable gate electrode portion due to acceleration. Projections for movable-range restriction use are provided on a lower surface of the movable portion other than the movable gate electrode portion, and form a gap which is narrower than a gap between the p-type silicon substrate and movable gate electrode portion.

15 Claims, 19 Drawing Sheets

SEMICONDUCTOR SENSOR WITH SUSPENDED MICROSTRUCTURE AND METHOD FOR FABRICATING SAME

CROSS REFERENCE TO RELATED APPLICATION

This application is based upon and claims the benefit of priority of the prior Japanese Patent Applications No. 6-194395 filed on Aug. 18, 1994, No. 7-92740 filed on Apr. 18, 1995 and No. 7-164172 filed on Jun. 29, 1995, the contents of which are incorporated herein by reference.

BACKGROUND OF THE INVENTION

1. Field of the Invention

The present invention relates to a semiconductor sensor to detect a physical quantity such as acceleration, yaw rate, vibration, or the like.

2. Related Arts

A device with a sensing portion and processing-circuit portion formed monolithically on a single semiconductor substrate is priorly known as a sensor of this type. The sensing portion is formed by depositing a sacrificial film on the semiconductor substrate, depositing thereon a film which becomes a movable portion, and removing the sacrificial film, so as to suspend a movable portion in a movable state with respect to the substrate. An example of such a sensor is disclosed in U.S. Pat. No. 5,326,726. Additionally, this Patent Gazette proposes forming a bump on a rear surface of the movable portion, i.e., on a surface opposing the substrate. This is effective in preventing sudden collision of the movable portion and substrate; this bump contacts the substrate prior to the movable portion even if sudden force acts on the movable portion, and can restrict displacement of the movable portion to within a predetermined value.

Here, the bump is formed as follows. Namely, as shown in FIG. 11 of U.S. Pat. No. 5,326,726, after deposition of the sacrificial film, a divot is formed on the surface of the sacrificial film so as to be corresponding to the bump location. Thereafter, as shown in FIG. 12 of U.S. Pat. No. 5,326,726, an open portion which extends as far as the substrate surface is formed in the sacrificial film in correspondence with a position which becomes an anchor portion of the movable portion (beam structure), and after depositing a polysilicon film which becomes the movable portion, the sacrificial film is etched and constructs the beam structure.

That is to say, there exists a problem in which a plurality of patterning steps and mask steps, i.e., photolithographic processes, become necessary due to the need to form depressions (divot and anchor opening) of differing depth in the sacrificial layer.

Additionally, ordinarily wet etching is performed to remove the sacrificial layer. There exists a problem in that the substrate and movable portion adhere and become fixed at the bump portion due to surface tension of the etchant at this time.

SUMMARY OF THE INVENTION

It is a first object of the present invention to provide a method for fabricating a semiconductor sensor which does not particularly incur an increase in mask steps even when a structure to restrict displacement of a beam-structure movable portion with respect to a substrate is disposed between the movable portion and substrate.

Furthermore, it is a second object of the present invention to provide a semiconductor sensor which can prevent adhesion of a substrate and movable portion.

Still further, it is a third object of the present invention to provide a semiconductor sensor which can prevent adhesion of a substrate and movable portion even without incurring an increase in mask steps.

To achieve the first object, a method for fabricating a semiconductor sensor according to the present invention includes the following steps:

depositing a sacrificial film of substantially uniform thickness on a surface of a substrate;

applying a photoresist on the sacrificial film;

exposing the photoresist by an exposure equipment employing a mask, the mask herein having a light-passing/light-blocking pattern to position at least an anchor-formation position and bump-formation position of a movable portion, and moreover having a pattern which exposes the photoresist at sufficient resist sensitivity with respect to the anchor-formation position and exposes the photoresist at insufficient resist sensitivity with respect to the bump-formation position;

patterning the sacrificial film using the exposed photoresist, whereby an opening of depth corresponding to thickness of the sacrificial film in correspondence with the anchor-formation position and a depression of depth shallower than thickness of the sacrificial film in correspondence with the bump-formation position are formed in the sacrificial film;

depositing a movable-portion formation film on the patterned sacrificial film; and etching the sacrificial film, whereby the movable-portion formation film makes up a movable portion suspended at the anchor-formation position so as to be fixed with respect to the substrate, and a bump is provided at the bump-formation position to locally shorten distance between the substrate and movable portion.

In specific terms, a positive resist can be employed in a case where a positive photomask is employed as the mask. In this case, it is preferred that the mask pattern be made so as to have a light-passing pattern composed of a light-passing portion to expose with a sufficient irradiation amount with respect to the anchor-formation position and a collection of fine light-passing portions each size of which is finer than a resolution of the exposure equipment such as an aligner or a stepper with respect to the bump-formation position. When done in this way, when the resist is developed, the resist of adequately exposed areas, i.e., the anchor-formation portion, is dissolved in the developing liquid and removed, and meanwhile, although the resist of areas where irradiation amount is insufficient, i.e., the bump-formation portion, is dissolved in the developing liquid, it comes to remain on the substrate in accordance with the amount of exposure. That is to say, a shallow depression comes to be formed in the bump-formation portion on the surface of the resist. Thereafter, it is sufficient to perform etching using this photoresist so as to transfer the photoresist pattern and surface configuration to the sacrificial film.

In this way, according to the present invention, sacrificial-film patterning for an anchor portion and bump portion of a movable portion is possible by only causing exposure of photoresist to be different by a pattern provided on a mask, and an increase in mask steps is not incurred.

Additionally, to realize the foregoing second object, a semiconductor sensor according to the present invention is characterized in having a substrate, a movable portion of beam structure fixed to the substrate, and a movable-range restricting portion disposed between the movable portion and the substrate to locally shorten distance between the movable portion and the substrate and restrict displacement of the movable portion to the substrate, and the movable-range restricting portion locally shortens distance between the movable portion and the substrate by a configuration whereby a tip thereof is sharp, pointed or rounded.

When the movable-range restricting portion is formed in this way, even if etchant has penetrated between the substrate and movable portion, it is possible to reduce surface tension thereof by the configuration of the movable-range restricting portion, and adhesion of the substrate and movable portion can be prevented.

Moreover, the foregoing third object can be realized by modifying the above-described method for fabricating a semiconductor sensor (the first object). Namely, when distribution is imparted to a light-passing portion at a collection of fine light-passing portions formed on the mask, it is possible to impart profile to exposure amount of resist of a bump-formation position, whereby configuration of a shallow depression formed in the surface of the resist can be controlled. That is to say, it is sufficient to establish a mask pattern so that the configuration of the shallow depression formed in the surface of the resist becomes configured to be sharpened, pointed or rounded at a bottom surface thereof.

BRIEF DESCRIPTION OF THE DRAWINGS

These and other objects, features and characteristics of the present invention will be appreciated from a study of the following detailed description, the appended claims, and drawings, all of which form a part of this application. In the drawings:

DETAILED DESCRIPTION OF THE PRESENTLY PREFERRED EXEMPLARY EMBODIMENTS

(FIRST EMBODIMENT)

A specific first embodiment of a semiconductor acceleration sensor according to the present invention will be described hereinafter with reference to the drawings.

Figure 1:
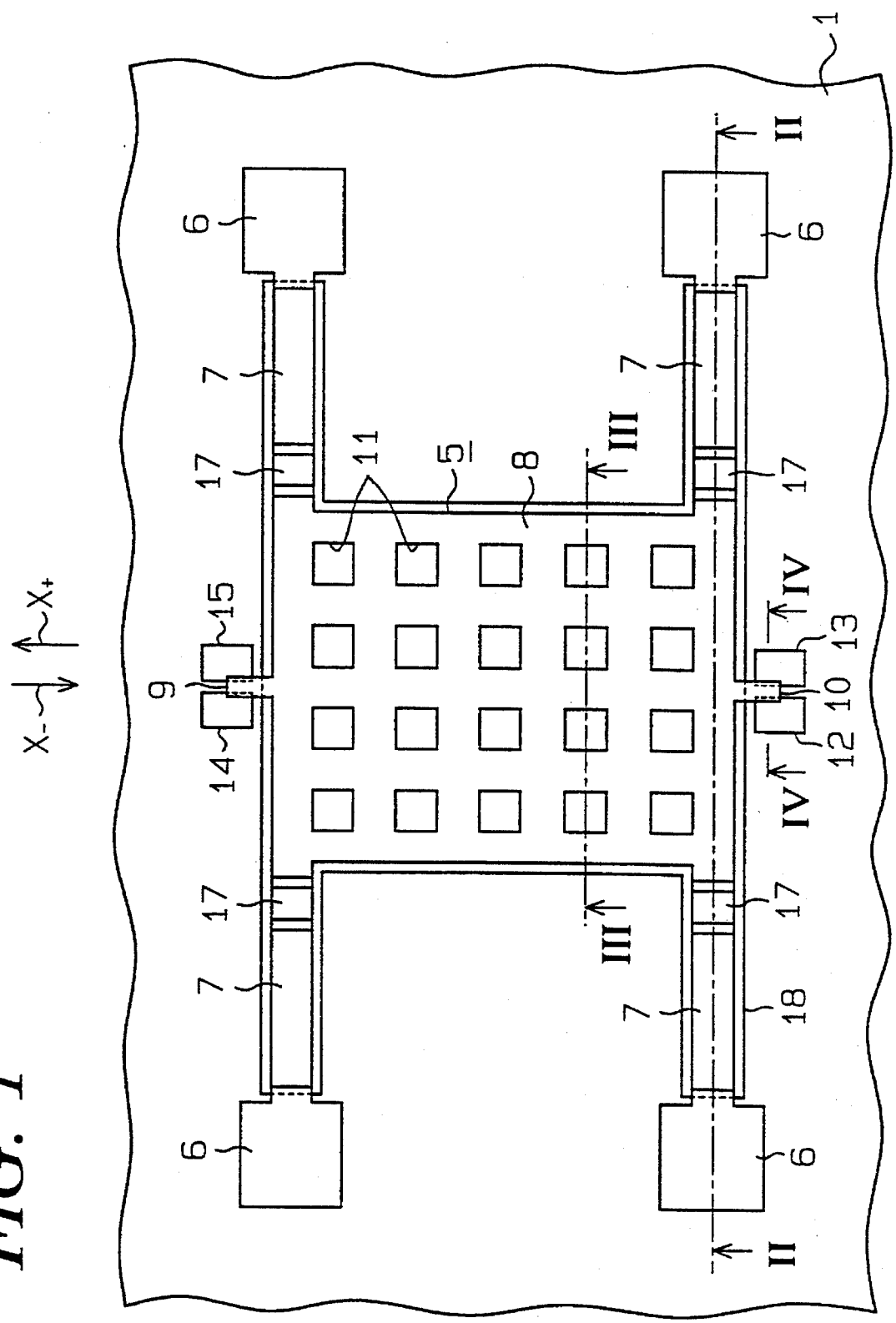
FIG. 1 is a plan view of a semiconductor acceleration sensor according to a first embodiment.
Figure 2:
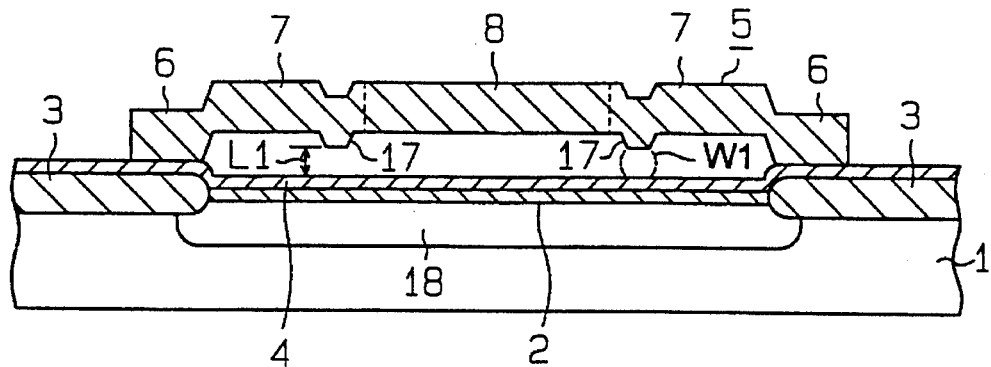
FIG. 2 is a sectional view taken along line II—II of FIG. 1.
Figure 3:
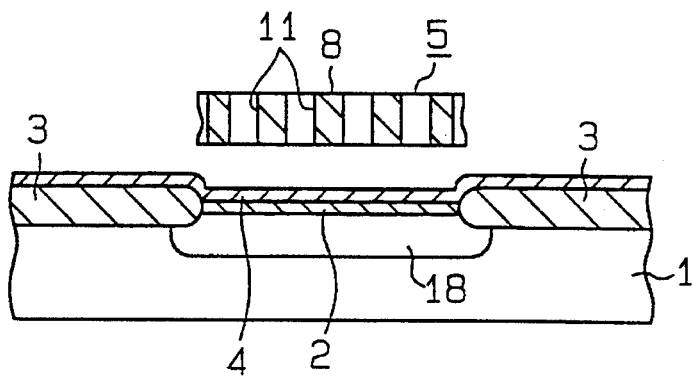
FIG. 3 is a sectional view taken along line III—III of FIG. 1.

FIG. 1 indicates a plan view of a semiconductor acceleration sensor according to the first embodiment. FIG. 2 indicates a sectional view taken along line II—II of FIG. 1, FIG. 3 indicates a sectional view taken along line III—III of FIG. 1, and FIG. 4 indicates a sectional view taken along line IV—IV of FIG. 1. The present semiconductor acceleration sensor is formed employing surface micromachining technology.

A silicon oxide film 2 as a gate insulation film is formed on a portion of a p-type silicon substrate 1 as a semiconductor substrate. This silicon oxide film 2 is to reduce leakage current of the substrate surface as well as to suppress deterioration with age of transistor characteristics with age. Additionally, a silicon oxide film 3 (according to the present embodiment, a LOCOS oxide film) having a predetermined thickness is similarly formed on a portion of the p-type silicon substrate 1. Furthermore, a silicon nitride film (insulation film) 4 for protection of the silicon oxide film 2 during etching of a sacrificial layer, which will be described later is formed on the silicon oxide film 2 and silicon oxide film 3. According to the present embodiment, a semiconductor substrate is structured from the p-type silicon substrate 1, silicon oxide film 2, silicon oxide film 3, and silicon nitride film 4.

Four anchor portions 6 are disposed on the silicon nitride film 4 in a formation region of the silicon oxide film 3, and a movable portion 5 taking the anchor portion as base ends is suspended above a formation region of the silicon oxide film 2. The movable portion 5 is composed of four beam portions 7, a weight portion 8, and movable gate electrode portions 9 and 10, and constitutes a beam structure. In greater detail, beam portions 7 of belt configuration extend from the anchor portions 6, and the weight portion 8 of square configuration is supported. Additionally, the movable gate electrode portions 9 and 10 of oblong configuration protrude in mutually opposing directions from the weight portion 8. The movable portion 5 and anchor portions 6 are composed of polysilicon thin film of a thickness of approximately 2 μm. Furthermore, the movable portion 5 (beam portions 7, weight portion 8, and movable gate electrode portions 9, 10) is disposed above the silicon substrate 1 (silicon nitride film 4) with a predetermined gap interposed therebetween. In this way, the movable gate electrode portions 9 and 10 are supported by a doubly supported beam portion (beam portions 7), and can be displaced in directions perpendicular to and parallel to the surface of the silicon substrate 1.

Additionally, a rectangular opening portion 11 is created on the weight portion 8, facilitating penetration of etching solution (etchant) during sacrificial-layer etching which will be described later.

Figure 4:
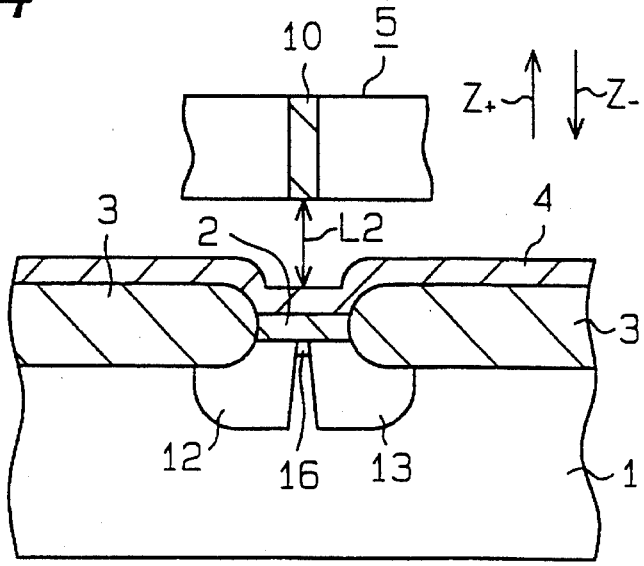
FIG. 4 is a sectional view taken along line IV—IV of FIG. 1.

As shown in FIG. 4, fixed electrodes 12 and 13 as a source/drain region composed of an n-type impurity diffusion layer at both sides with respect to the movable gate electrode portion 10 are formed on the silicon substrate 1 below the movable gate electrode portion 10 of the movable portion 5. Similarly, as shown in FIG. 1, fixed electrodes 14 and 15 as a source/drain region composed of an n-type impurity diffusion layer at both sides with respect to the movable gate electrode portion 9 are formed on the silicon substrate 1 below the movable gate electrode portion 9 of the movable portion 5. As shown in FIG. 4, a channel region 16 is formed between the fixed electrodes 12 and 13 on the silicon substrate 1, and this channel region 16 is produced by applying voltage between the silicon substrate 1 and movable electrode portion 10. Accordingly, drain current flows through this channel region 16 due to application of voltage between the fixed electrodes 12 and 13. Similarly, a channel region (not illustrated) is formed between the fixed electrodes 14 and 15 on the silicon substrate 1, and this channel region is produced by applying voltage between the silicon substrate 1 and movable electrode portion 9. Accordingly, drain current flows through this channel region 16 due to application of voltage between the fixed electrodes 14 and 15.

As shown in FIG. 2, projections (bumps) for movable-range restriction use (movable-range restricting portions) 17 are formed respectively in positions proximate to the weight portion 8 on the several beam portions 7 of the movable portion 5 to protrude toward the silicon substrate 1. A gap (distance) L1 between these projections for movable-range restriction use 17 and the silicon nitride film 4 over the silicon substrate 1 is smaller than a gap (distance) L2 (see FIG. 4) between the movable gate electrode portion 9 and 10 of the movable portion 5 and the silicon nitride film 4 over the silicon substrate 1. In this way, the projections for movable-range restriction use 17 are provided in positions proximate to the weight portion 8 on the beam portions 7, and along with this, are formed to cause downwardly displacement of the movable portion 5 composed of a polysilicon thin film.

Additionally, an underlying electrode 18 composed of an n-type impurity diffusion region is formed on the surface of the silicon substrate 1 in a region without the fixed electrodes 12, 13, 14, and 15 at a portion opposing the movable portion 5. This underlying electrode 18 is maintained equipotentially to the potential of the movable portion 5, and suppresses electrostatic force generated between the silicon substrate 1 and the movable portion 5.

Peripheral circuit (not illustrated) is formed in the periphery of a disposed region of the movable portion 5 on the silicon substrate 1. Accordingly, the peripheral circuit and the movable portion 5 (movable gate electrode portions 9 and 10) are electrically connected and, along with this, the peripheral circuit and the fixed electrodes 12, 13, 14, and 15 are electrically connected and, moreover, the peripheral circuit and the underlying electrode 18 are electrically connected.

Operation of this semiconductor acceleration sensor will be described next.

When voltage is applied between the movable portion 5 and the silicon substrate 1, and between the fixed electrodes 12 and 13 (14 and 15), the channel region 16 is formed, and current flows between the fixed electrodes 12 and 13 (14 and 15). Herein, in a case where this semiconductor acceleration sensor is subjected to acceleration and the movable gate electrode portions 9 and 10 (movable portion 5) are (is) displaced in the $X_+$ direction indicated in FIG. 1 (a direction parallel to the surface of the silicon substrate 1), then due to a change in the surface area (the channel width in transistor terms) of the channel region between the fixed electrodes, current flowing between the fixed electrodes 12 and 13 decreases, and current flowing between the fixed electrodes 14 and 15 increases. Additionally, in a case where the movable gate electrode portions 9 and 10 (movable portion 5) are (is) displaced in the $X_-$ direction indicated in FIG. 1 (a direction parallel to the surface of the silicon substrate 1), then due to a change in the surface area (the channel width in transistor terms) of the channel region between the fixed electrodes, current flowing between the fixed electrodes 12 and 13 increases, and current flowing between the fixed electrodes 14 and 15 decreases. Meanwhile, in a case where this acceleration sensor is subjected to acceleration and the movable gate electrode portions 9 and 10 are displaced in the $Z_+$ direction indicated in FIG. 4 (a direction perpendicular to the surface of the silicon substrate 1 and moreover moving away from the silicon substrate 1), the carrier concentration of the channel region 16 is diminished due to a change in electrical field intensity, and so the foregoing currents flowing between the fixed electrodes are simultaneously diminished.

In this way, current flowing between the fixed electrodes 12 and 13 and between the fixed electrodes 14 and 15 changes due to changes in the mutual positions of the movable gate electrode portions 9 and 10 and the fixed electrodes 12 and 13 as well as 14 and 15 due to acceleration, and acceleration of two dimensions is detected by the magnitude and phase of this current change.

Additionally, the projections for movable-range restriction use 17 are provided between the semiconductor substrate (the p-type silicon substrate 1, silicon oxide films 2 and 3, and silicon nitride film 4) and the movable portion 5, i.e., on a lower surface of the beam portions 7 other than the movable gate electrode portions 9 and 10, the gap (L1) which is narrower than the gap (L2) between the silicon nitride film 4 and the movable gate electrode portions 9 and 10 is established, and a movement range in the direction (indicated by $Z_-$ in FIG. 4) in which the movable portion 5 (movable gate electrode portions 9 and 10) approaches the silicon substrate 1 is restricted. Accordingly, if the acceleration range is normal, operation is as a normal acceleration sensor, but if excessive acceleration is applied in a direction in which the movable portion 5 separates from the silicon substrate 1, the movable portion (movable gate electrode portions 9 and 10) attempts to deform in the direction approaching the substrate due to acceleration thereof. At this time, the projections for movable-range restriction use 17 contact the silicon nitride film 4 before the movable gate electrode portions 9 and 10 contact the silicon substrate 1 (silicon nitride film 4), and further approach of the movable gate electrode portions 9 and 10 to the silicon substrate 1 side is blocked. That is to say, excessive deformation thereof is suppressed. In this way, contact of the movable gate electrode portions 9 and 10 and the silicon substrate 1 (silicon nitride film 4) is avoided, and MISFET transistor characteristics do not deteriorate.

In this way, according to the present embodiment, the projections for movable-range restriction use 17 are provided on a lower surface of the movable portion 5 other than the movable gate electrode portions 9 and 10, and a gap narrower than the gap between the silicon nitride film 4 and movable gate electrode portions 9 and 10 is formed. As a result thereof, the projections for movable-range restriction use 17 makes contact first before the movable gate electrode portions 9 and 10 contact the silicon substrate 1 (silicon nitride film 4) even in a case where excessive acceleration is applied to the movable gate electrode portions 9 and 10, and detection error and deterioration with age of the semiconductor acceleration sensor can be reduced.

Additionally, the projections for movable-range restriction use 17 are provided respectively for the four beam portions 7, and so due to the projections for movable-range restriction use 17 provided on the several beams 7, the projections for movable-range restriction use 17 can reliably be caused to make contact before the movable gate electrode portions 9 and 10 contact the silicon substrate 1 (silicon nitride film 4) even if torsion occurs in the movable portion 5 (beam portions 7).

Furthermore, because the projections for movable-range restriction use 17 are provided in locations proximate to the weight portion 8 on the beam portions 7 of the movable portion 5, even when excessive acceleration is applied and the weight portion 8 attempts to deform, deformation thereof can be prevented by the projections for movable-range restriction use 17.

Still further, because the projections for movable-range restriction use 17 are formed so as to have a configuration that the thin film of uniform film thickness, which makes up the movable portion 5, is deformed downwardly, the projections 17 can easily be formed.

Fabrication steps for the semiconductor acceleration sensor according to the present embodiment will be described next employing FIGS. 5 to 11 and FIG. 2, with reference to the section taken along line II—II of FIG. 1.

Figure 5:
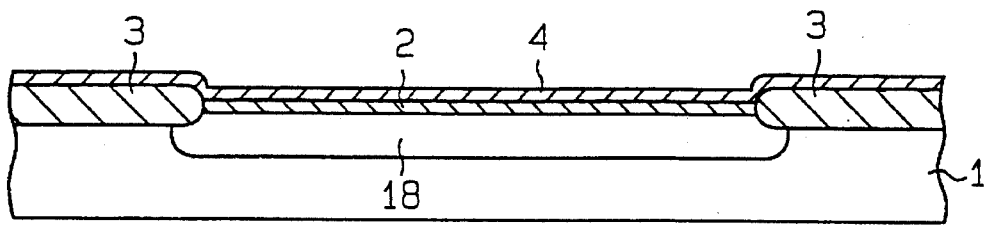
FIGS. 5 through 11 are sectional views to describe in sequence fabrication steps of the semiconductor acceleration sensor according to the first embodiment.

Firstly, as shown in FIG. 5, a p-type silicon substrate 1 is prepared and a silicon oxide film 3 (according to the present embodiment, a LOCOS oxide film) is formed in a predetermined region on a main surface thereof. Accordingly, a silicon oxide film 2 is formed by thermal oxidation on a surface of the p-type silicon substrate 1 other than the silicon oxide film 3; moreover, impurities are introduced simultaneously thereunder by an ion-implantation process or the like and thermal treatment is performed to form n-type impurity diffusion layers which become an underlying electrode 18 as well as source regions 12, 14 and drain regions 13, 15 of MISFETs (not illustrated in FIG. 5). Furthermore, a silicon nitride film 4 is formed on the entire surfaces of the silicon oxide film 2 and silicon oxide film 3 by low-pressure CVD or the like.

Figure 6:
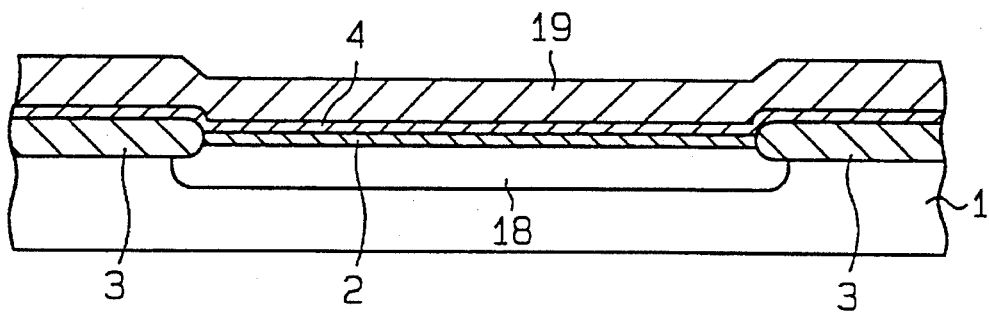

To continue, as shown in FIG. 6, a silicon oxide film 19 which becomes a sacrificial layer is formed by plasma enhanced CVD or the like on an entire surface of the silicon nitride film 4. Thickness of this silicon oxide film 19 is uniform.

Figure 7:
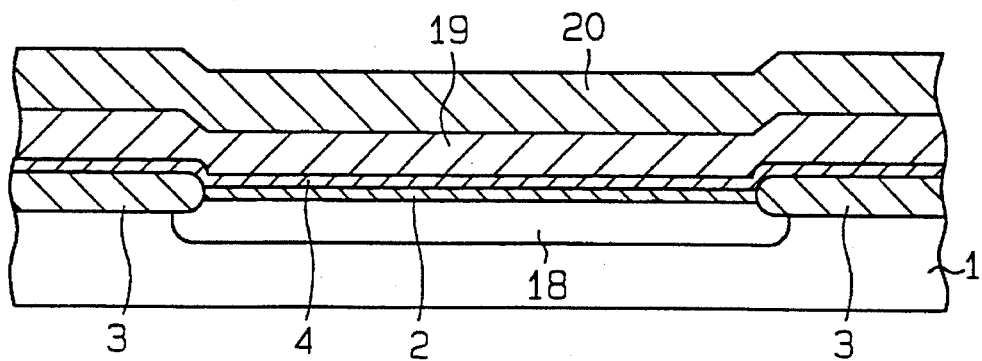

Thereafter, as shown in FIG. 7, a positive resist 20 is applied to the entire surface of the silicon oxide film 19 by spin-coating.

Figure 8:
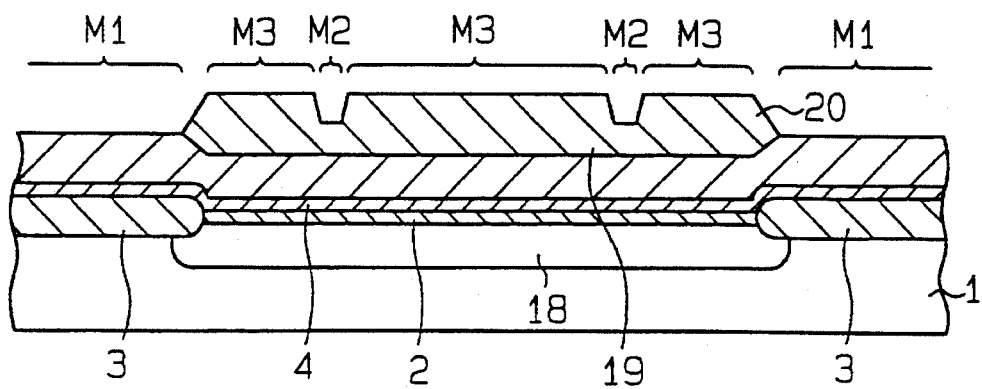
Figure 12:
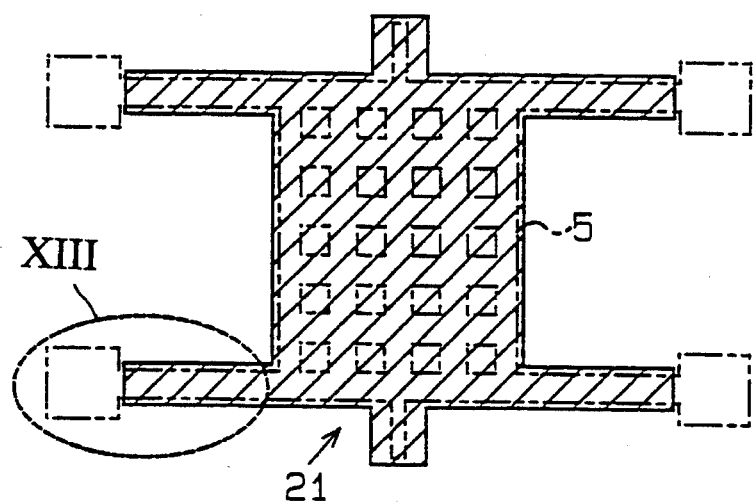
FIG. 12 is a plan view indicating a light-blocking pattern of a photomask to pattern a sacrificial film, as well as indicating a final configuration of a movable portion.
Figure 13:
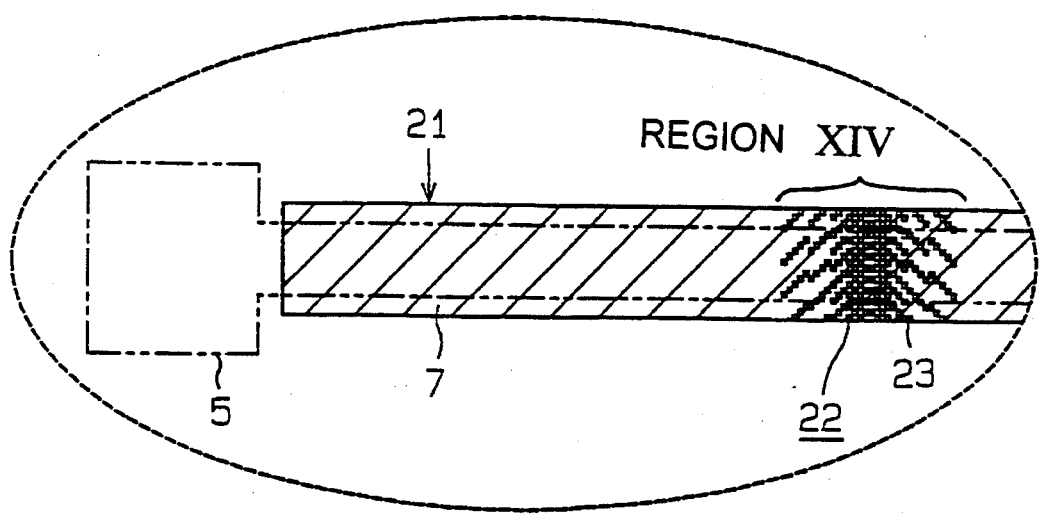
FIG. 13 is an enlarged view of portion XIII of FIG. 12.

Accordingly, as shown in FIG. 8, the positive resist 20 is exposed using a positive photomask indicated in FIGS. 12 and 13 and developed, forming a portion M1 where the positive resist 20 is entirely removed, a portion (projection for movable-range restriction use formation area) M2 where a portion of the positive resist 20 is removed in the direction of thickness, and a portion M3 where the positive resist 20 is allowed to remain in entirety.

Figure 14:
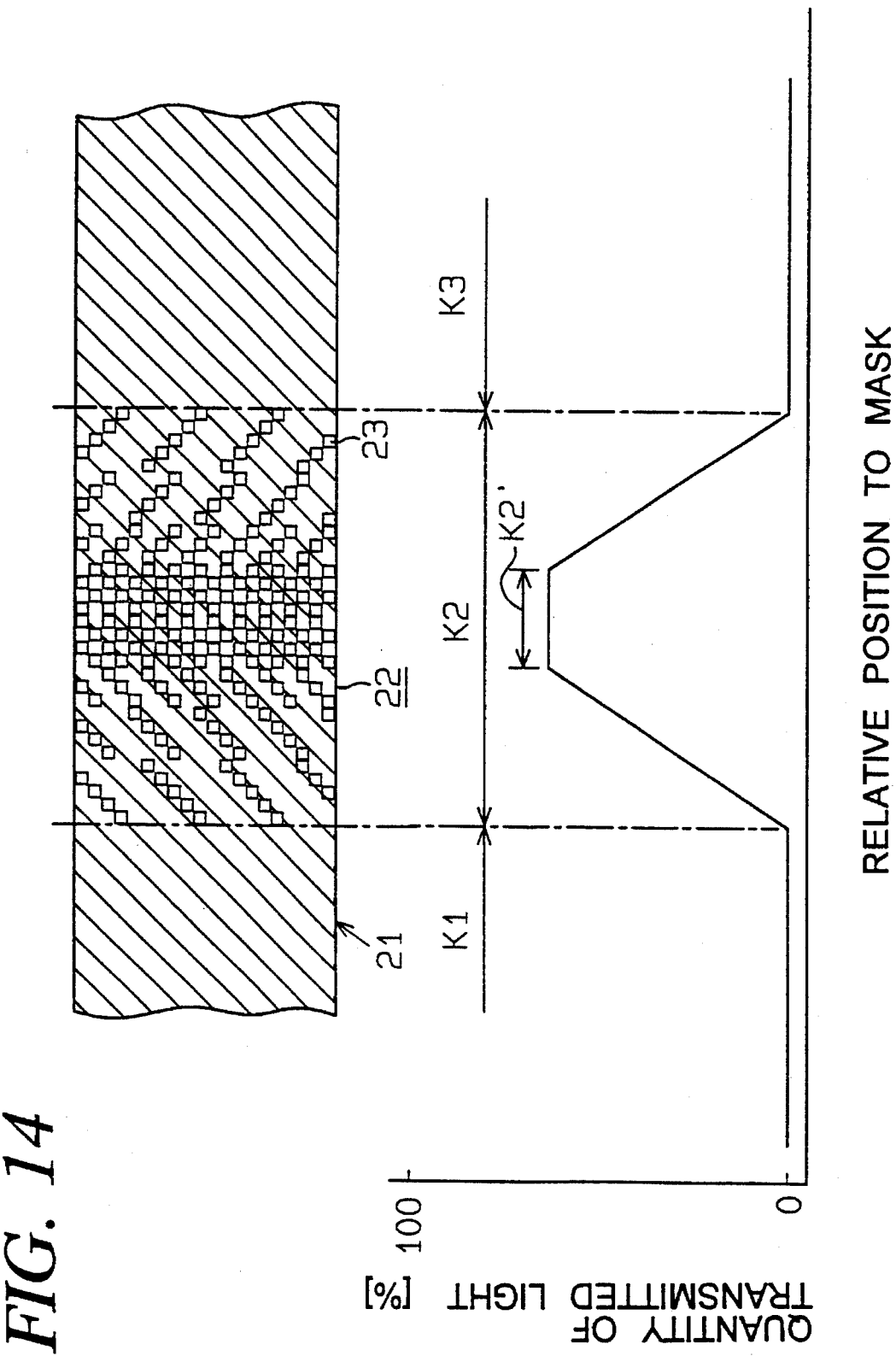
FIG. 14 is an explanatory diagram indicating a quantity of transmitted light in profile-exposure portion XIV of a photomask.

This processing will be described in detail hereinafter. FIG. 12 shows the photomask 21 to pattern the sacrificial layer into the configuration indicated by hatching in the formation region of the movable portion 5. FIG. 13 is an enlarged view of portion XIII, which is a portion of this photomask 21. Herein, the hatched portion indicates a light-blocking portion formed by chrome or the like. As in portion XIV in FIG. 13, a profile-exposure portion 22 as a collection of fine patterns, each of which is composed of a light-passing area smaller than a resolution of the exposure equipment such as an aligner or a stepper, is formed in a portion (projection for movable-range restriction use formation area) of the portion corresponding to the beams 7. This profile-exposure portion 22 is such that a multiplicity of minute rectangular windows 23 through which light passes are distributed and profile-formed at a predetermined density distribution as shown in FIG. 14. The size of these rectangular windows 23 is a dimension not more than the resolution of the exposure equipment for exposure using this photomask 21. For example, if the exposure equipment used is a 10-to-1 reducing stepper and resolution thereof is 1 micron, a size of one side of one rectangle which is 1 micron or less at a 10× reticle size is appropriate. FIG. 14 indicates a further enlarged view of the profile-exposure portion 22 of the photomask 21 of FIG. 13, and corresponds to quantity of transmitted light of the photomask 21. A quantity of transmitted light in regions K1 and K3 which are not the profile-exposure portion 22 is zero. Meanwhile, density (number/unit area) of individual windows 23 is changed so that a quantity of transmitted light in a region K2 which is the profile-exposure portion 22 becomes larger toward the center. Furthermore, the quantity of transmitted light in the region K2 which is the profile-exposure portion 22 becomes larger toward the center, but at the center portion there exists a region K2' where the quantity of transmitted light becomes uniform at a maximum value.

When developed after profile exposure using the photomask 21 described above with reference to FIGS. 12 to 14, resist sensitivity in the portion M1 where light was passed completely is sufficient and is developed completely, as shown in FIG. 8, and the resist 20 is completely removed. Additionally, the resist 20 remains completely in the portion M3 where light was completely blocked. Meanwhile, the portion M2 where light was partially passed is exposed, but because the irradiation amount is not sufficient, the resist 20 remains even when developed, and the film thickness of the resist 20 is reduced.

Figure 9:
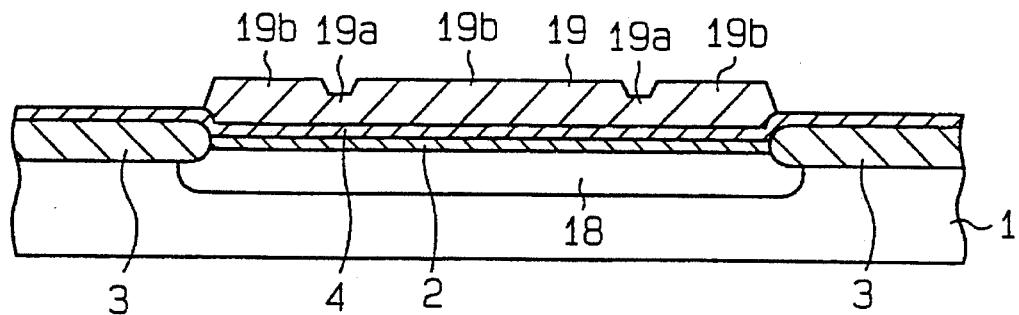

Next, as shown in FIG. 9, the silicon oxide film 19 which becomes the sacrificial layer is wet-etched or dry-etched with the developed resist 20 as a mask. It is preferred that dry etching using $CF_4$ and $O_2$ be performed. The $CF_4$ etches the silicon oxide film 19, and the $O_2$ etches the resist 20. When flow rate and pressure of the respective gases are established so that the etching rate of the silicon oxide film 19 by the $CF_4$ and the etching rate of the resist 20 by the $O_2$ become substantially equal at this time, the configuration of the developed resist 20 is transferred unchanged to the silicon oxide film 19 which becomes the sacrificial layer. That is to say, regions 19a where film thickness has partially become thinner and regions 19b where film thickness is completely unchanged are formed on the silicon oxide film 19 which becomes the sacrificial layer. These regions 19a where film thickness has become thinner are formation areas of the projections for movable-range restriction use 17. Additionally, portions of the region where the silicon oxide film 19 has disappeared become the formation areas of the anchor portions 6. That is to say, the photomask 21 has the profile-exposure portion 22 as a fine pattern, together with having a pattern to open the resist 20 of the anchor-portion formation areas of the movable portion 5.

Figure 10:
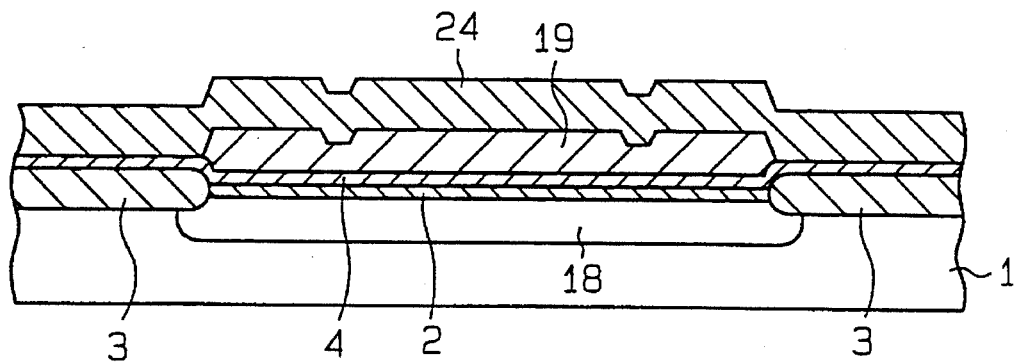

Next, as shown in FIG. 10, a polysilicon thin film 24 as a movable-portion formation film is formed by low-pressure CVD or the like.

Figure 11:
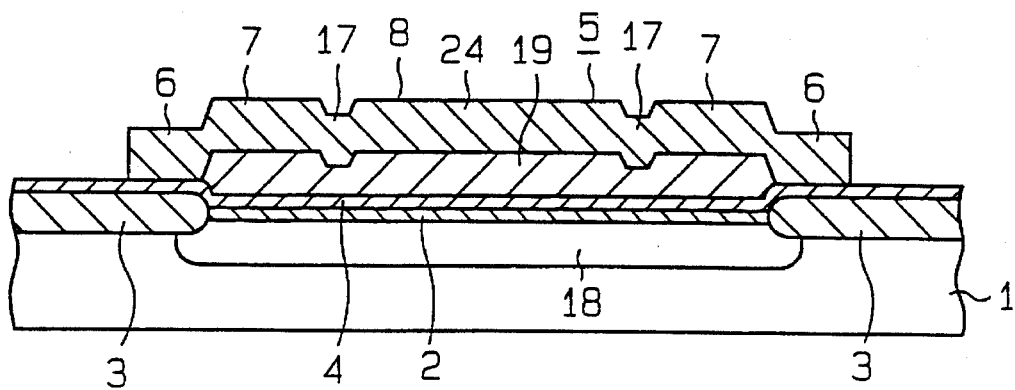

Next, as shown in FIG. 11, the polysilicon thin film 24 is patterned, and the anchor portions 6, opening portion 11, beam portions 7, weight portion 8, movable gate electrode portions 9 and 10, and projections for movable-range restriction use 17 are simultaneously formed.

Finally, as shown in FIG. 2, when the silicon oxide film 19 (sacrificial layer) is etched, the beam portions 7, weight portion 8, movable gate electrode portions 9 and 10, and projections for movable-range restriction use 17, except for the anchor portions 6, are separated from the silicon nitride film 4 which is a foundation and suspended, and thereby a movable structure is formed.

To describe this etching step of the silicon oxide film 19 (sacrificial layer) in greater detail, the substrate is immersed in an etchant and the silicon oxide film 19 (sacrificial layer) is etched, and thereafter the substrate is removed from the etchant. Because etching liquid adheres to the surface of the substrate in this state, the substrate is immersed in pure water to replace the etching liquid with pure water, and thereafter the substrate is removed from the pure water and dried. During this drying of the substrate, pure water exists between the movable portion (beam portions 7, weight portion 8, and movable gate electrode portions 9 and 10) and the substrate 1, the pure water becomes droplets due to the progression of drying, and there may be cases where the movable portion (beam portions 7, weight portion 8, and movable gate electrode portions 9 and 10) is pulled toward and adheres to the surface of the substrate 1 due to surface tension of the droplets, and a movable structure cannot be formed. In contrast to this, according to the present embodiment, the above-described adhesion of the moving portion to the substrate surface can be prevented due to the existence of projections for movable-range restriction use 17. This is presumed to be due to the following reason. Namely, even if a droplet of the foregoing pure water is formed between the movable portion 5 and the substrate 1, the droplet is formed and limited between the projections for movable-range restriction use 17 and the substrate 1 as indicated as W1 in FIG. 2, and moreover this droplet is small. Accordingly, surface tension of the droplet acting between the movable portion (beam portions 7, weight portion 8, and movable gate electrode portions 9 and 10) and the substrate 1 becomes small, and adhesion of the movable portion to the substrate surface can be prevented. Additionally, even if hypothetically the movable portion were to temporarily stick to the surface of the substrate surface, because surface tension of the droplet is small, the movable portion separates from the substrate surface and returns to its original state the rigidity (restorative strength) of the beams. In this way, a movable structure can easily and reliably be formed.

In this way, the silicon oxide film 19 (sacrificial layer) of uniform thickness was formed on the main surface of the semiconductor substrate (p-type silicon substrate 1, silicon oxide films 2 and 3, and silicon nitride film 4—first step), a portion of the silicon oxide film 19 corresponding to a projection for movable-range restriction use formation area was made thinner (second step), a polysilicon thin film 24 (movable-portion formation film composed of a thin film) was formed on the silicon oxide film 19 (third step), and the silicon oxide film 19 below the polysilicon thin film 24 was etched away and projections for movable-range restriction use 17 to form a gap narrower than the gap between the silicon nitride film 4 and movable gate electrode portions 9 and 10 was formed on the lower surface of the movable portion 5 other than the movable gate electrode portions 9 and 10 (fourth step). Additionally, in this second step, the resist 20 was formed on the silicon oxide film 19, a portion of the resist 20 was thinned by exposure and development employing the photomask 21 having a fine pattern (profile-exposure portion 22) of not more than the resolution of the exposure equipment, and a portion of the silicon oxide film 19 was thinned by etching the portion of the silicon oxide film 19. In this way, the projections for movable-range restriction use 17 can be fabricated with no increase of the photomask steps by thinning a portion of the silicon oxide film 19 using the resist 20 having the thinned portion. As a result thereof, the semiconductor acceleration sensor indicated in FIG. 1 can be fabricated with no increase in process steps.

A sample application of the present embodiment will be described hereinafter.

According to the present embodiment, projections for movable-range restriction use 17 were formed respectively on four beam portions 7, but the configuration, formation positions, number and so on of the projections for movable-range restriction use 17 can be altered as desired. For example, according to the foregoing embodiment the projections for movable-range restriction use 17 were formed at beams 7, but formation at weight portions 8 is also acceptable. In this case, deformation of the weight portions 8 occurs when the surface area of the weight portions 8 has been enlarged to heighten sensitivity, but deformation of the weight portions 8 can be prevented when the projections for movable-range restriction use 17 are provided in respective corners of the weight portions 8. Additionally, one projection for movable-range restriction use 17 each was respectively provided on the beam portions 7, but it is also acceptable to provide a plurality of projections for movable-range restriction use 17 per one beam portion 7.

Furthermore, according to the foregoing embodiment, the movable portion 5 was caused to be a doubly supported beam structure, but it is also acceptable for the movable portion 5 to be a cantilever beam structure.

Still further, embodiment as a semiconductor yaw-rate sensor, vibration sensor, or the like other than a semiconductor acceleration sensor is also acceptable.

(SECOND EMBODIMENT)

Figure 15:
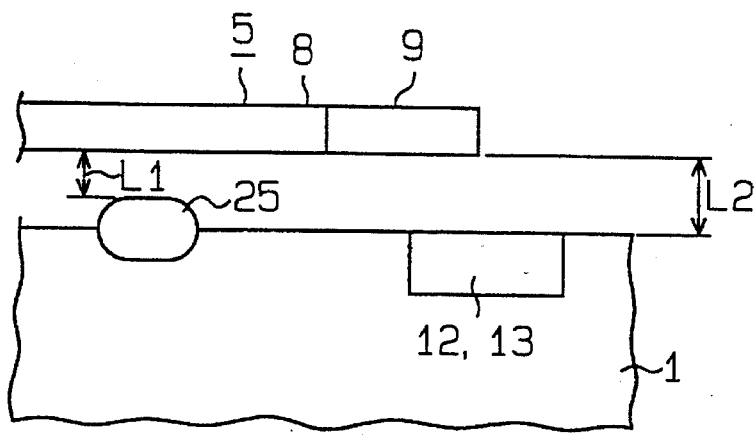
FIG. 15 is an essential sectional view of a semiconductor acceleration sensor according to a second embodiment.
Figure 16:
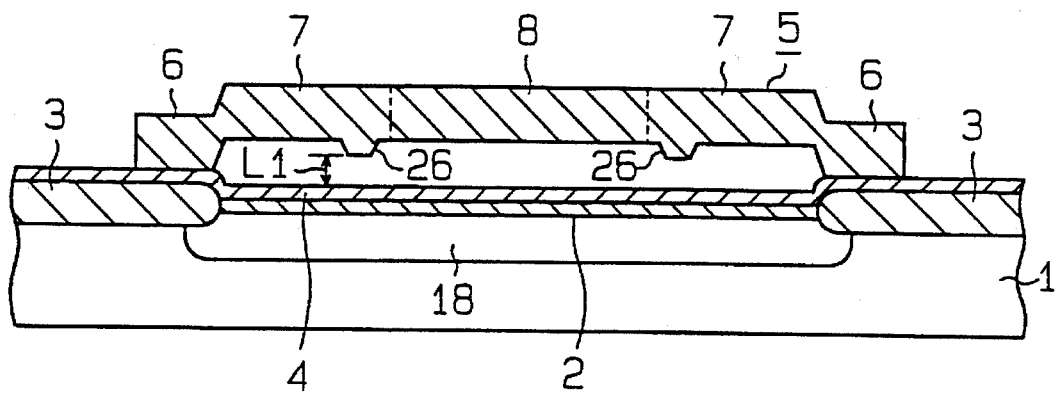
FIG. 16 is an essential sectional view of a semiconductor acceleration sensor according to a third embodiment.

According to the foregoing first embodiment, projections for movable-range restriction use 17 were provided on a movable portion 5, but as shown in FIG. 15, formation of a projection for movable-range restriction use 25 as a movable-range restricting portion on an upper surface of a p-type silicon substrate 1 (semiconductor substrate) is also acceptable. In FIG. 15, the projection for movable-range restriction use 25 is formed by a LOCOS oxide film. This can be formed simultaneously with formation of a LOCOS film 3 formed on the substrate 1 surface. Additionally, when the surface is flattened by etch-back after sacrificial-film deposition, a gap L1 can be established, and mask steps also do not increase.

Moreover, it is also acceptable to apply the first or second embodiment to provide projections for movable-range restriction use also on an upper surface of the p-type silicon substrate 1 (semiconductor substrate) together with providing the projections for movable-range restriction use 17 on the movable portion 5. In this case, it is acceptable to provide a first projection on the lower surface of the movable portion, and together with this, provide a second projection on the upper surface of the substrate to oppose this first projection.

(THIRD EMBODIMENT)

As shown in FIG. 2, according to the above-described first embodiment, the projections for movable-range restriction use 17 were formed so as to cause the movable portion 5 composed of a polysilicon thin film to be displaced downwardly, and were of the same film thickness as the movable portion 5, but it is also acceptable to form a projection for movable-range restriction use 26 as a movable-range restricting portion by making the film thickness of the movable portion 5 thicker. In this case, a device with favorable shock resistance when excessive acceleration is obtained.

(FOURTH EMBODIMENT)

Figure 17:
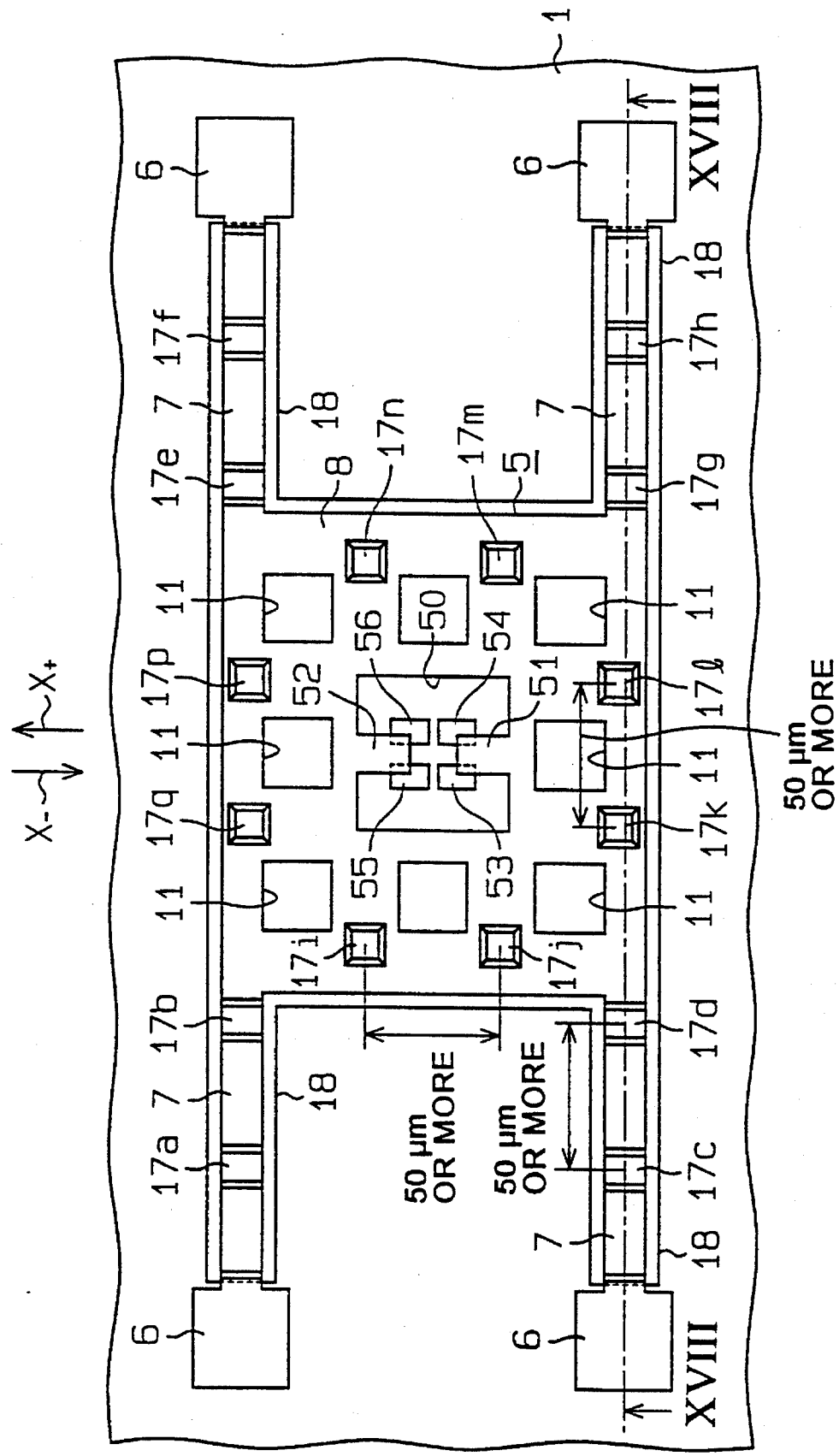
FIG. 17 is a plan view of a semiconductor acceleration sensor according to a fourth embodiment.
Figure 18:
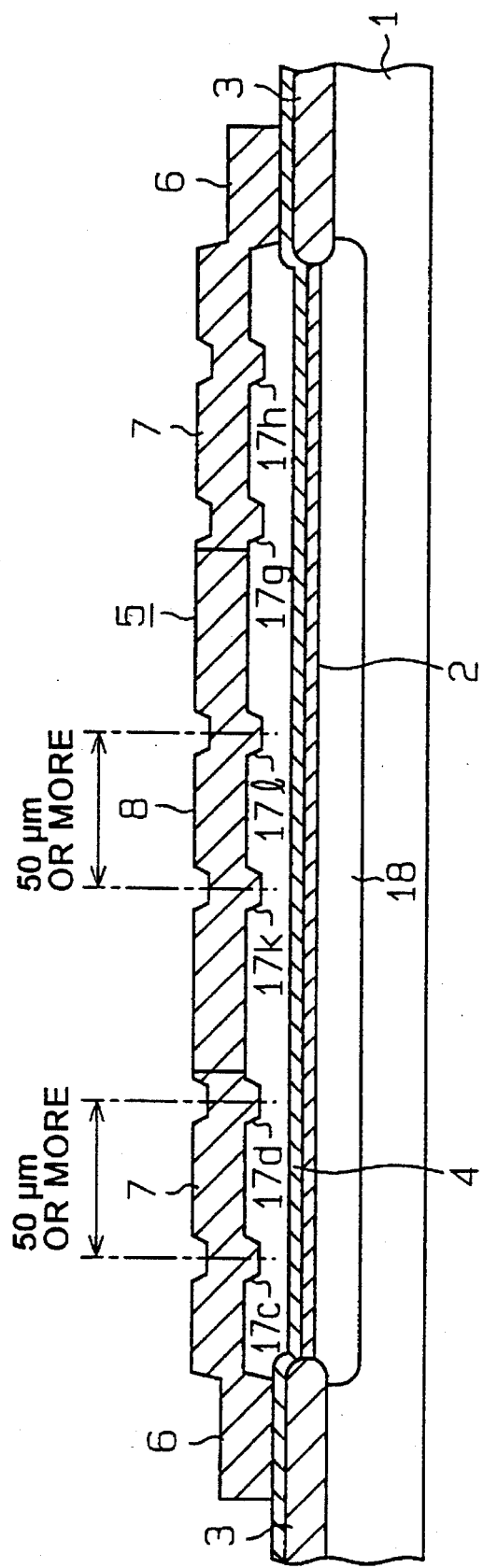
FIG. 18 is a sectional view taken along line XVIII—XVIII of FIG. 17.

FIGS. 17 and 18 indicate a fourth embodiment. FIG. 18 is a sectional view taken along line XVIII—XVIII of FIG. 17. Two each of projections for movable-range restriction use 17a to 17h are disposed separately on respective beam portions 7, and an interval of these several projections for movable-range restriction use 17a to 17h is 50 μm or more. Furthermore, on a weight portion 8 as well, two each of projections for movable-range restriction use 17i to 17q of square configuration are disposed separately on respective sides of the weight portion 8 of square configuration, and an interval of these several projections for movable-range restriction use 17i to 17q also is 50 μm or more. The interval of the projections for movable-range restriction use 17a to 17q is caused to be 50 μm or more to further reduce the sum of the opposing surface area of the projections for movable-range restriction use 17a to 17q and the substrate surface (underlying electrode 18), reduce the sum of surface tension of droplets (replacement fluid for etchant) formed between the projections for movable-range restriction use 17a to 17q and the substrate surface in the sacrificial-layer etching step, and avoid the movable portion being pulled toward and adhering to the substrate surface.

Moreover, in FIGS. 17 and 18, an opening portion (through-hole) 50 is provided in a center of the weight portion 8 with regard to the movable gate electrode portions 9 and 10 and fixed electrodes 12, 13, 14, and 15 as source/drain regions of FIG. 1, and a cantilever-beam type movable gate electrode portion 51 extending in an $X_+$ direction as well as a cantilever-beam type movable gate electrode portion 52 extending in an $X_-$ direction are formed. That is to say, a pair of opposing beam type movable electrode portions 51 and 52 are formed in the opening portion 50. Additionally, fixed electrodes 53, 54, 55, and 56 are formed at positions relative to the cantilever-beam type movable gate electrode portions 51 and 52, similarly to the positional relationship of the transistors in FIG. 1. In this way, the pair of beam type movable gate electrode portions 51 and 52 can be arranged proximately in the center portion of the weight portion 8. As a result thereof, even in a case where, for example, the weight portion 8 has warped, it can be made difficult for the movable gate electrode portions 51 and 52 to contact the substrate in comparison with the case where the movable gate electrode portions 9 and 10 protrude from opposite sides of the weight portion 8 as indicated in FIG. 1, and additionally two transistors can be formed proximately at locations (regions) where the crystalline structure of the substrate is equal and it becomes possible to attempt uniformity of element characteristics.

(FIFTH EMBODIMENT)

A fifth embodiment of a semiconductor acceleration sensor according to the present invention will be described hereinafter with reference to the drawings.

Figure 19:
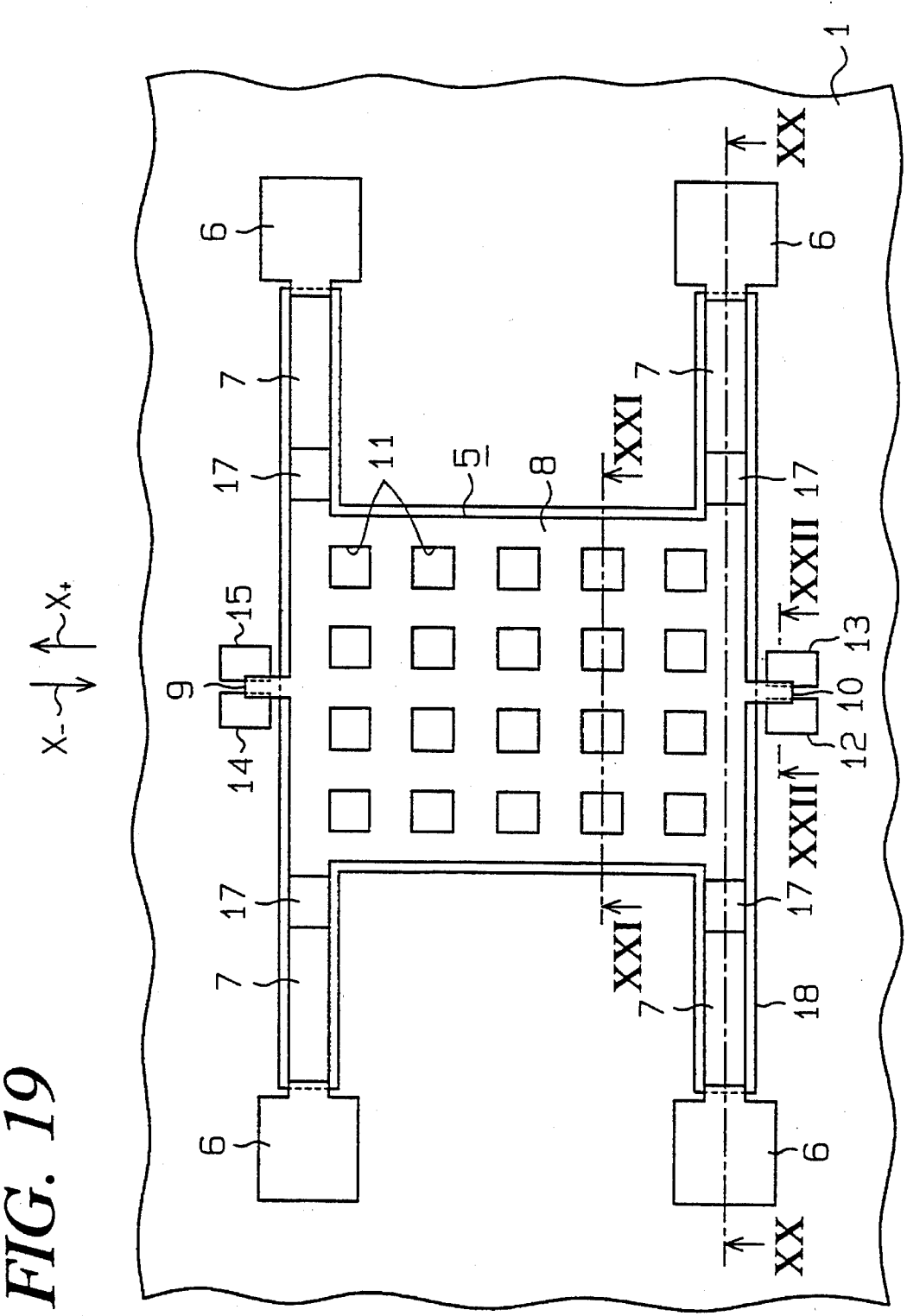
FIG. 19 is a plan view of a semiconductor acceleration sensor according to a fifth embodiment.
Figure 20:
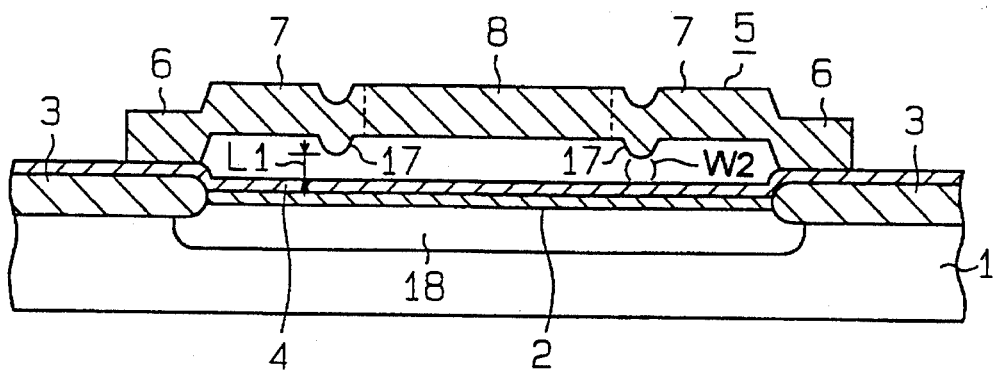
FIG. 20 is a sectional view taken along line XX—XX of FIG. 19.
Figure 21:
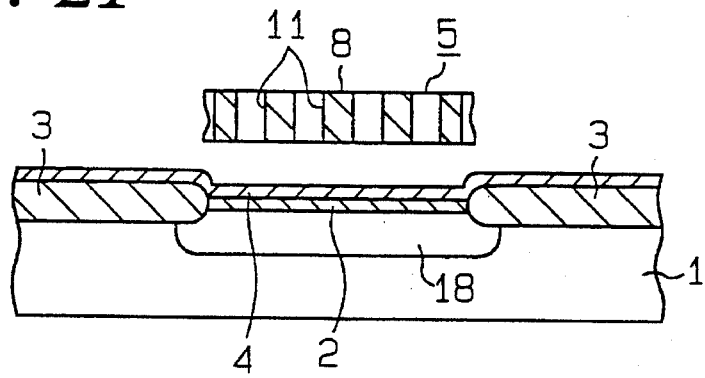
FIG. 21 is a sectional view taken along line XXI—XXI of FIG. 19.

FIG. 19 indicates a plan view of a semiconductor acceleration sensor according to the fifth embodiment. FIG. 20 indicates a sectional view taken along line XX—XX of FIG. 19, FIG. 21 indicates a sectional view taken along line XXI—XXI of FIG. 19, and FIG. 22 indicates a sectional view taken along line XXII—XXII of FIG. 19. The present semiconductor acceleration sensor is a modification of the first embodiment, and is a device formed employing surface micromachining technology.

A silicon oxide film 2 as a gate insulation film is formed on a portion of a p-type silicon substrate 1 as a semiconductor substrate. This silicon oxide film 2 is to reduce leakage current of the substrate surface as well as to prevent transistor characteristics from deteriorating with age. Additionally, a silicon oxide film 3 (according to the present embodiment, a LOCOS oxide film) having a predetermined thickness is similarly formed on a portion of the p-type silicon substrate 1. Furthermore, a silicon nitride film (insulation film) 4 for protection of the silicon oxide film 2 during etching of a sacrificial layer which will be described later is formed on the silicon oxide film 2 and silicon oxide film 3. According to the present embodiment, a semiconductor substrate is structured from the p-type silicon substrate 1, silicon oxide film 2, silicon oxide film 3, and silicon nitride film 4.

Four anchor portions 6 are disposed on the silicon nitride film 4 in a formation region of the silicon oxide film 3, and a movable portion 5 taking the anchor portions as base ends is suspended above a formation region of the silicon oxide film 2. The movable portion 5 is composed of four beam portions 7, a weight portion 8, and movable gate electrode portions 9 and 10, and constitutes a beam structure. In greater detail, beam portions 7 of belt configuration extend from the anchor portions 6, and the weight portion 8 of square configuration is supported. Additionally, the movable gate electrode portions 9 and 10 of oblong configuration protrude in mutually opposing directions from the weight portion 8. The movable portion 5 and anchor portions 6 are composed of polysilicon thin film of a thickness of approximately 2 μm. Furthermore, the movable portion 5 (beam portions 7, weight portion 8, and movable gate electrode portions 9, 10) is disposed above the silicon substrate 1 (silicon nitride film 4) with a predetermined gap interposed therebetween. In this way, the movable portion 5 is arranged above the substrate 1 by anchor portions 6 with a predetermined gap interposed therebetween, and can be displaced in directions perpendicular to and parallel to the surface of the silicon substrate 1.

Additionally, rectangular opening portions 11 are created on the weight portion 8, facilitating penetration of etchant during sacrificial-layer etching which will be described later.

Figure 22:
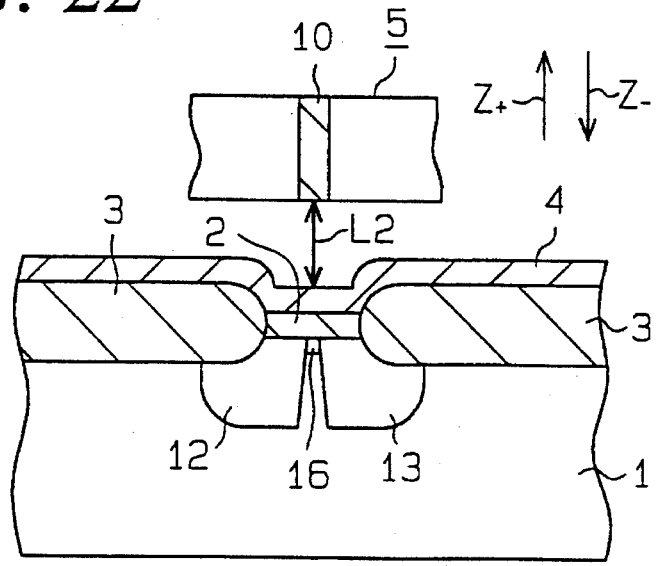
FIG. 22 is a sectional view taken along line XXII—XXII of FIG. 19.

As shown in FIG. 22, fixed electrodes 12 and 13 as a source/drain region composed of an n-type impurity diffusion layer at both sides with respect to the movable gate electrode portion 10 are formed on the silicon substrate 1 below the movable gate electrode portion 10 of the movable portion 5. Similarly, as shown in FIG. 19, fixed electrodes 14 and 15 as a source/drain region composed of an n-type impurity diffusion layer at both sides with respect to the movable gate electrode portion 9 are formed on the silicon substrate 1 below the movable gate electrode portion 9 of the movable portion 5. As shown in FIG. 22, a channel region 16 is formed between the fixed electrodes 12 and 13 on the silicon substrate 1, and this channel region 16 is produced by applying voltage between the silicon substrate 1 and movable electrode portion 10. Accordingly, drain current flows through this channel region 16 due to application of voltage between the fixed electrodes 12 and 13. Similarly, a channel region (not illustrated) is formed between the fixed electrodes 14 and 15 on the silicon substrate 1, and this channel region is produced by applying voltage between the silicon substrate 1 and movable electrode portion 9. Accordingly, drain current flows through this channel region due to application of voltage between the fixed electrodes 14 and 15.

As shown in FIG. 20, projections for movable-range restriction use (movable-range restricting portions) 17 are formed respectively in positions proximate to the weight portion 8 on the several beam portions 7 of the movable portion 5 to protrude (be displaced) toward the silicon substrate 1. Each tip of these projections for movable-range restriction use 17 is rounded; that is, the bottom of the projection 17 has a shell type shape. A gap (distance) L1 between these projections for movable-range restriction use 17 and the silicon nitride film 4 over the silicon substrate 1 is smaller than a gap L2 indicated in FIG. 22, i.e., the gap (distance) L2 between the movable gate electrode portion 9 and 10 of the movable portion 5 and the silicon nitride film 4 over the silicon substrate 1. In this way, the projections for movable-range restriction use 17 are provided in positions proximate to the weight portion 8 on the beam portions 7, and along with this, are formed to cause to downward displacement of the movable portion 5 composed of a polysilicon thin film.

Additionally, an underlying electrode 18 composed of an n-type impurity diffusion region is formed on the surface of the silicon substrate 1 in a region without the fixed electrodes 12, 13, 14, and 15 at a portion opposing the movable portion 5. This underlying electrode 18 is maintained equipotentially to the potential of the movable portion 5, and suppresses electrostatic force generated between the silicon substrate 1 and the movable portion 5.

Peripheral circuit (not illustrated) is formed in the periphery of a disposed region of the movable portion 5 on the silicon substrate 1. Accordingly, the peripheral circuit and the movable portion 5 (movable gate electrode portions 9 and 10) are electrically connected and, along with this, the peripheral circuit and the fixed electrodes 12, 13, 14, and 15 are electrically connected and, moreover, the peripheral circuit and the underlying electrode 18 are electrically connected.

Operation of this semiconductor acceleration sensor will be described next.

When voltage is applied between the movable portion 5 and the silicon substrate 1, and between the fixed electrodes 12 and 13 (14 and 15), the channel region 16 is formed, and current flows between the fixed electrodes 12 and 13 (14 and 15). Herein, in a case where this semiconductor acceleration sensor is subjected to acceleration and the movable gate electrode portions 9 and 10 (movable portion 5) are (is) displaced in the $X_+$ direction indicated in FIG. 19 (a direction parallel to the surface of the silicon substrate 1), then due to a change in the surface area (the channel width in transistor terms) of the channel region between the fixed electrodes, current flowing between the fixed electrodes 12 and 13 decreases, and current flowing between the fixed electrodes 14 and 15 increases. Additionally, in a case where the movable electrode portions 9 and 10 (movable portion 5) are (is) displaced in the $X_-$ direction indicated in FIG. 19 (a direction parallel to the surface of the silicon substrate 1), then due to a change in the surface area (the channel width in transistor terms) of the channel region between the fixed electrodes, current flowing between the fixed electrodes 12 and 13 increases, and current flowing between the fixed electrodes 14 and 15 decreases. Meanwhile, in a case where this acceleration sensor is subjected to acceleration and the movable electrode portions 9 and 10 are displaced in the $Z_+$ direction indicated in FIG. 22 (a direction perpendicular to the surface of the silicon substrate 1 and moreover moving away from the silicon substrate 1), the carrier concentration of the channel region 16 is diminished due to a change in electrical field intensity, and so the foregoing currents between the fixed electrodes are simultaneously diminished.

In this way, current flowing between the fixed electrodes 12 and 13 and between the fixed electrodes 14 and 15 changes due to changes in the mutual positions of the movable gate electrode portions 9 and 10 and the fixed electrodes 12 and 13 as well as 14 and 15 due to acceleration, and acceleration of two dimensions is detected by the magnitude and phase of this current change.

Additionally, the projections for movable-range restriction use 17 are provided between the semiconductor substrate (the p-type silicon substrate 1, silicon oxide films 2 and 3, and silicon nitride film 4) and the movable portion 5, i.e., on a lower surface of the beam portions 7 other than the movable gate electrode portions 9 and 10, the gap (L1) which is narrower than the gap (L2) between the silicon nitride film 4 and the movable gate electrode portions 9 and 10 is established, and a movement range in the direction (indicated by $Z_-$ in FIG. 22) in which the movable portion 5 (movable gate electrode portions 9 and 10) approaches the silicon substrate 1 is restricted. Accordingly, if the acceleration range is normal, operation is as a normal acceleration sensor, but if excessive acceleration is applied in a direction in which the movable portion 5 separates from the silicon substrate 1, the movable portion (movable gate electrode portions 9 and 10) attempts to deform in the direction of approach toward the substrate due to acceleration thereof. At this time, the projections for movable-range restriction use 17 contact the silicon nitride film 4 before the movable gate electrode portions 9 and 10 contact the silicon substrate 1 (silicon nitride film 4), and further approach of the movable gate electrode portions 9 and 10 to the silicon substrate 1 side is blocked. That is to say, excessive deformation thereof is suppressed. In this way, contact of the movable gate electrode portions 9 and 10 and the silicon substrate 1 (silicon nitride film 4) is avoided, and MISFET transistor characteristics do not deteriorate.

Fabrication steps for the semiconductor acceleration sensor according to the present embodiment will be described next employing FIGS. 23 to 29 and FIG. 20, with reference to the section taken along line XX—XX of FIG. 19.

Figure 23:
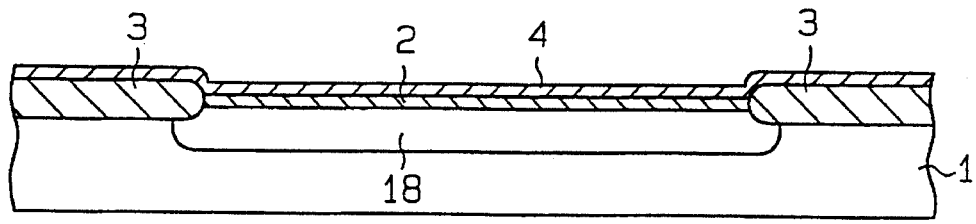
FIGS. 23 through 29 are sectional views to describe in sequence fabrication steps of the semiconductor acceleration sensor according to the fifth embodiment.

Firstly, as shown in FIG. 23, a p-type silicon substrate 1 is prepared and a silicon oxide film 3 (according to the present embodiment, a LOCOS oxide film) is formed in a predetermined region on a main surface thereof. Accordingly, a silicon oxide film 2 is formed by thermal oxidation on a surface of the p-type silicon substrate 1 other than the silicon oxide film 3; moreover, impurities are introduced by an ion-implantation process or the like and thermal treatment is performed to form n-type impurity diffusion layers which become an underlying electrode 18 as well as source regions 12, 14 and drain regions 13, 15 of MISFETs (not illustrated in FIG. 23). Furthermore, a silicon nitride film 4 is formed on the entire surfaces of the silicon oxide film 2 and silicon oxide film 3 by low-pressure CVD or the like.

Figure 24:
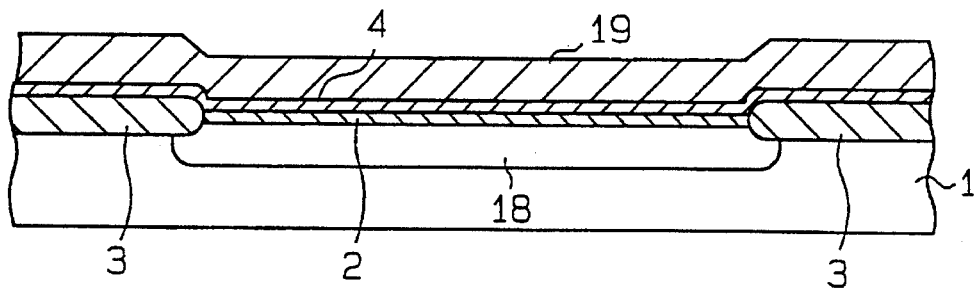

To continue, as shown in FIG. 24, a silicon oxide film 19 which becomes an sacrificial layer is formed by plasma enhanced CVD or the like on an entire surface of the silicon nitride film 4. Thickness of this silicon oxide film 19 is substantially uniform.

Figure 25:
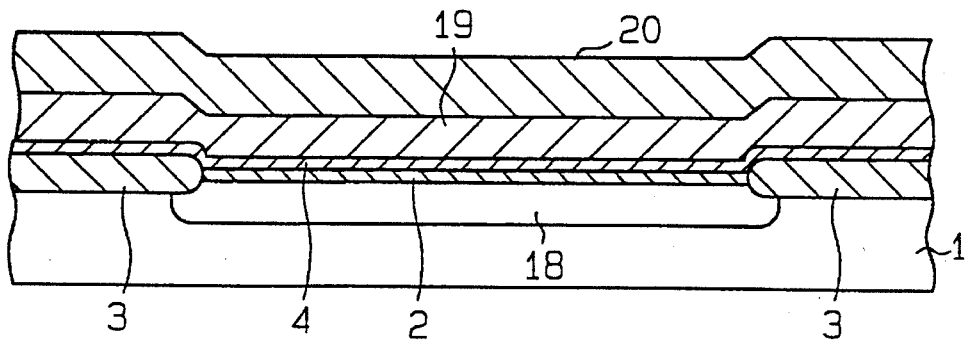

Thereafter, as shown in FIG. 25, a positive resist 20 is applied to the entire surface of the silicon oxide film 19 by spin-coating.

Figure 26:
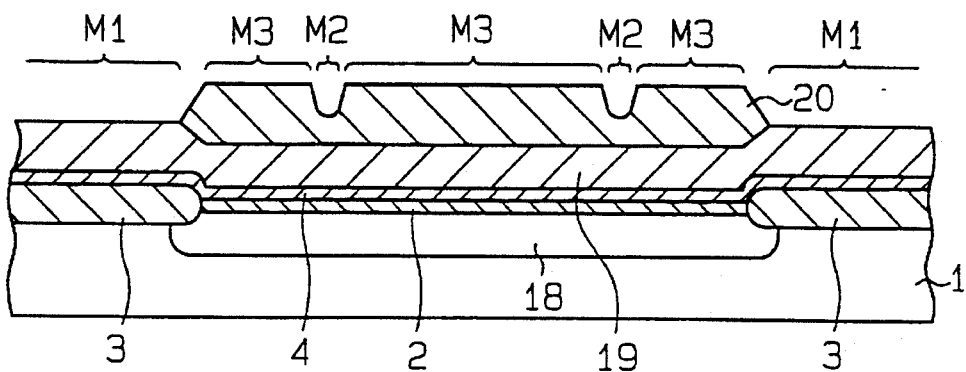
Figure 30:
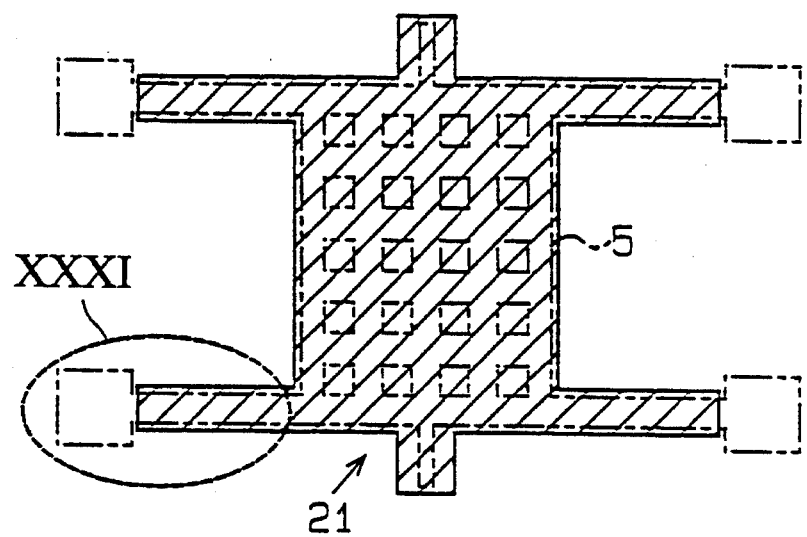
FIG. 30 is a plan view indicating a light-blocking pattern of a photomask to pattern a sacrificial film, as well as indicating a final configuration of a movable portion.
Figure 31:
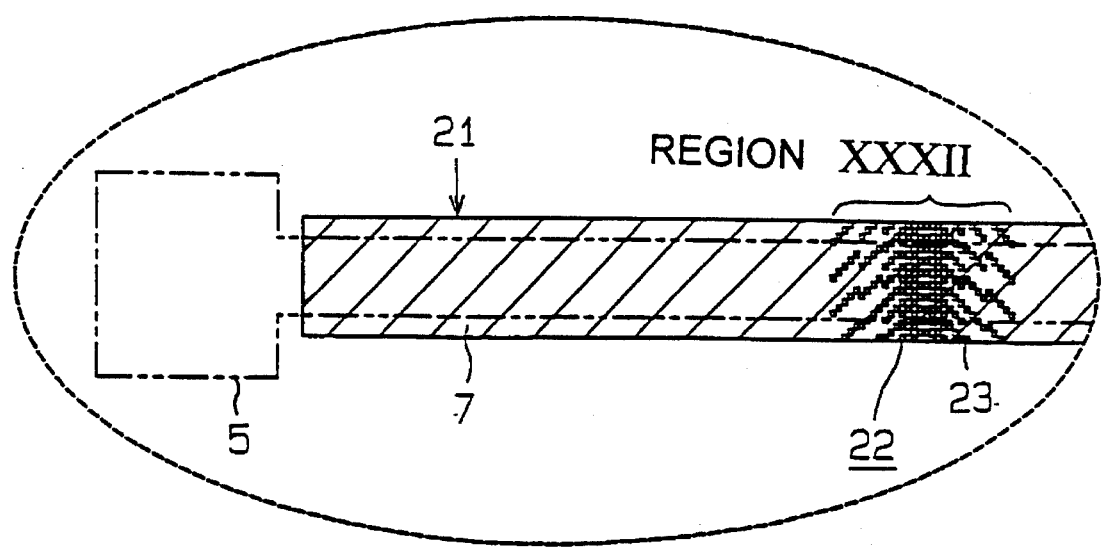
FIG. 31 is an enlarged view of portion XXXI of FIG. 30.

Accordingly, as shown in FIG. 26, the positive resist 20 is exposed using a positive photomask indicated in FIGS. 30 and 31 and developed, forming a portion M1 where the positive resist 20 is entirely removed, a portion (projection for movable-range restriction use formation area) M2 where the positive resist 20 is partially removed in the direction of thickness, and a portion M3 where the positive resist 20 is allowed to remain in entirety.

Figure 32:
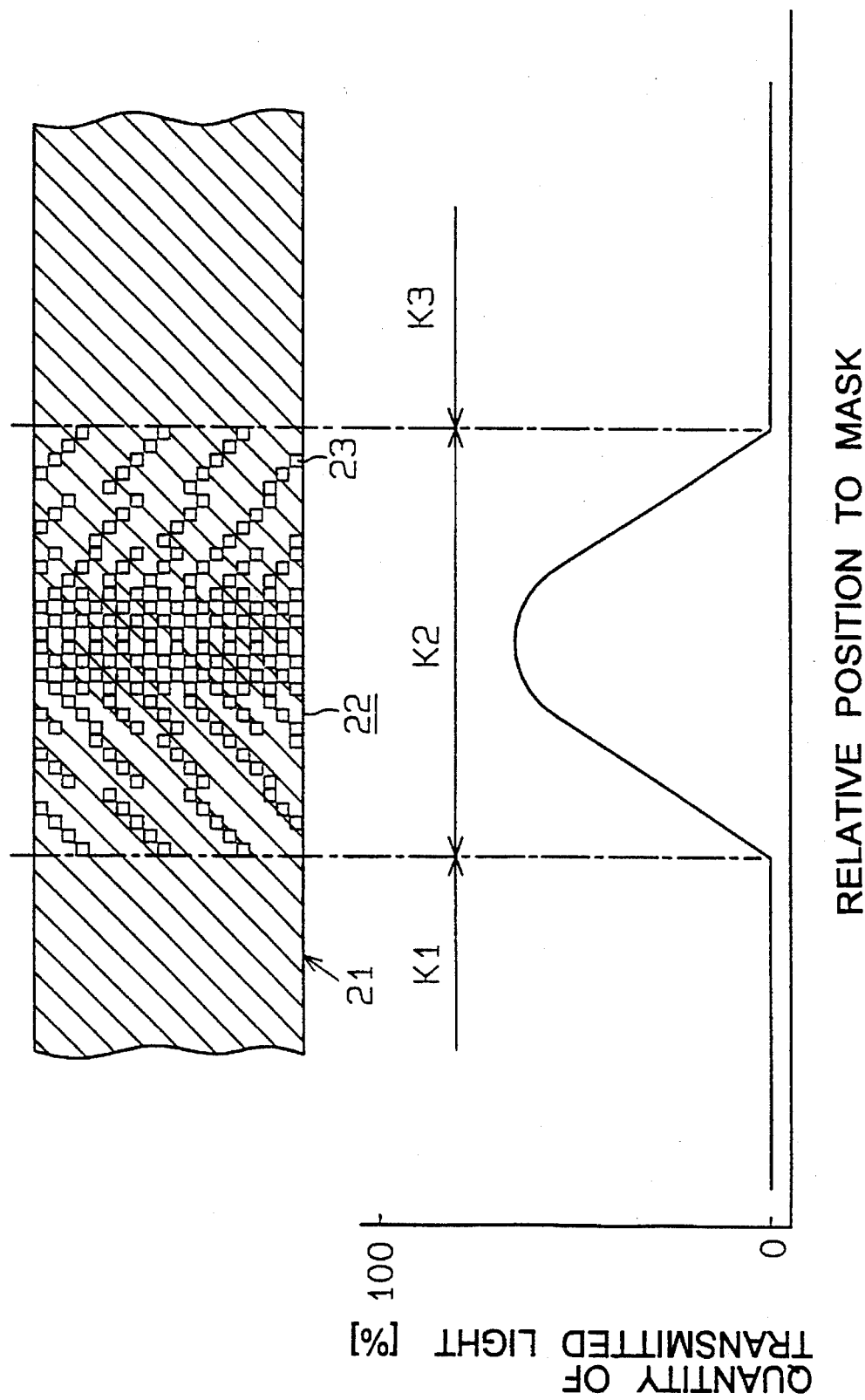
FIG. 32 is an explanatory diagram indicating a quantity of transmitted light in profile-exposure portion XXXII of a photomask.

This processing will be described in detail hereinafter. FIG. 30 shows the photomask 21 to pattern the sacrificial layer into the configuration indicated by hatching in the formation region of the movable portion 5. FIG. 31 is an enlarged view of portion XXXI, which is a portion of this photomask 21. Herein, the hatched portion indicates a light-blocking portion formed by chrome or the like. As in portion XXXII in FIG. 31, a profile-exposure portion 22 as a fine pattern, which has a light-passing area smaller than a resolution of the exposure equipment such as an aligner or a stepper, is formed in a portion (a formation region of projection for movable-range restriction use) of the portion corresponding to the beams 7. This profile-exposure portion 22 is such that a multiplicity of minute rectangular windows 23 through which light passes are distributed and profile-formed at a predetermined density distribution as shown in FIG. 32. The size of these rectangular windows 23 is a dimension not more than the resolution of the exposure equipment for exposure using this photomask 21. For example, if the exposure equipment used is a 10-to-1 reducing stepper and resolution thereof is 1 micron, a size of one side of one rectangle which is 1 micron or less at a 10× reticle size is appropriate. FIG. 32 indicates a further enlarged view of the profile-exposure portion 22 of the photomask 21 shown in FIG. 31, and corresponding characteristics showing a quantity of transmitted light through the photomask 21.

A quantity of transmitted light in regions K1 and K3 which are not the profile-exposure portion 22 is zero.

Meanwhile, the density (number/unit area) of individual windows 23 is changed so that a quantity of transmitted light in a region K2 which is the profile-exposure portion 22 becomes larger toward the center. Furthermore, the quantity of transmitted light in the region K2 which is the profile-exposure portion 22 becomes larger toward the center, but the center portion has a peak where the quantity of transmitted light is rounded.

When developed after profile exposure using the photomask 21 described above with reference to FIGS. 30 to 32, resist sensitivity in the portion M1 where light was passed completely is sufficient and is developed completely, as shown in FIG. 26, and so the resist 20 is completely removed. Additionally, the resist 20 remains completely in the portion M3 where light was completely blocked. Meanwhile, the film thickness of the resist 20 is reduced in the portion M2 where light was partially passed and exposure of resist 20 was insufficient.

Figure 27:
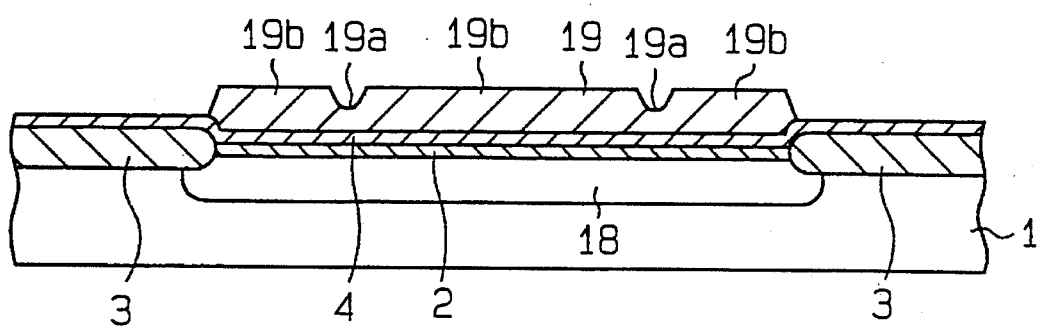

Next, as shown in FIG. 27, the silicon oxide film 19 which becomes the sacrificial layer is wet-etched or dry-etched using the developed resist 20 as a mask. It is preferred that dry etching using $CF_4$ and $O_2$ be performed. The $CF_4$ etches the silicon oxide film 19, and the $O_2$ etches the resist 20. When flow rate and pressure of the respective gases are established so that the etching rate of the silicon oxide film 19 by the $CF_4$ and the etching rate of the resist 20 by the $O_2$ become substantially equal at this time, the configuration of the developed resist 20 is transferred unchanged to the silicon oxide film 19 which becomes the sacrificial layer. That is to say, regions (grooves) 19a where film thickness has partially become thinner and regions 19b where film thickness is completely unchanged are formed on the silicon oxide film 19 which becomes the sacrificial layer. These regions (grooves) 19a where film thickness has become thinner are formation areas of the projections for movable-range restriction use 17, and bottom-surface side tips of the regions (grooves) 19a are rounded. Additionally, portions of the region (deep groove) where the silicon oxide film 19 has disappeared become the formation areas of the anchor portions 6.

Figure 28:
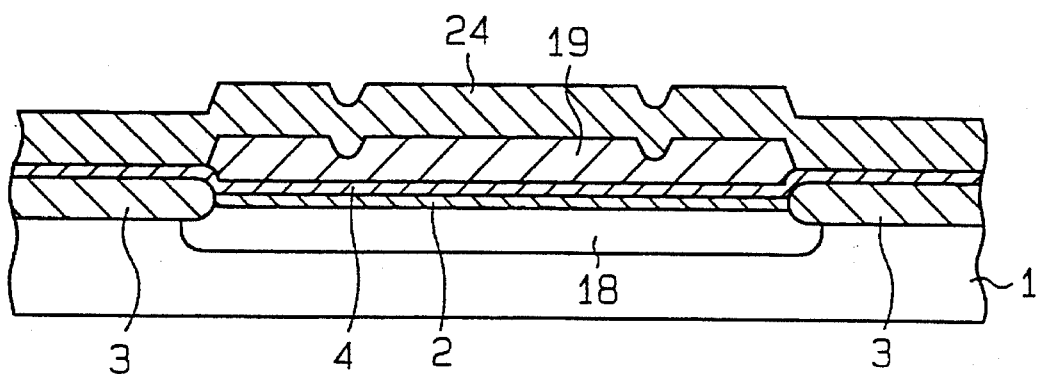

Next, as shown in FIG. 28, a polysilicon thin film 24 as a movable-portion formation film is formed by low-pressure CVD or the like.

Figure 29:
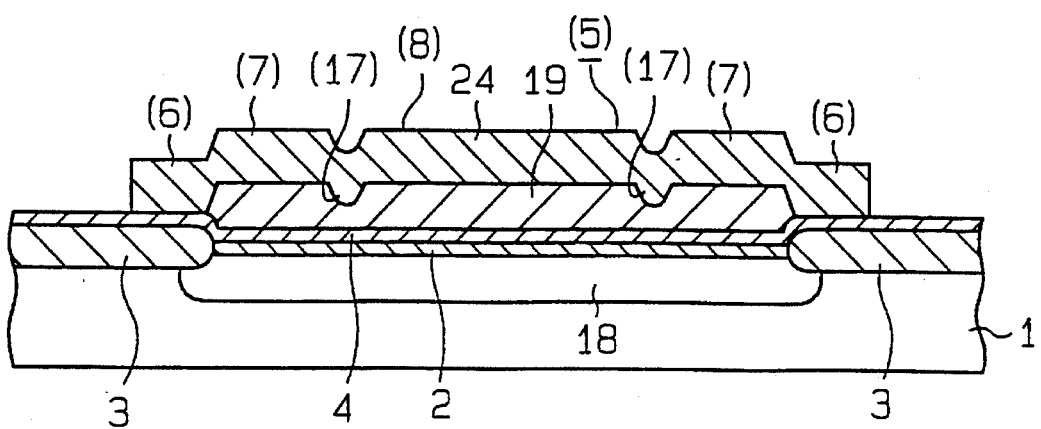

Next, as shown in FIG. 29, the polysilicon thin film 24 is patterned, and simultaneously formed into the configuration of the anchor portions 6, opening portions 11, beam portions 7, weight portion 8, movable gate electrode portions 9 and 10, and projections for movable-range restriction use 17.

Finally, as shown in FIG. 20, when the silicon oxide film 19 (sacrificial layer) is etched, the beam portions 7, weight portion 8, movable gate electrode portions 9 and 10, and projections for movable-range restriction use 17, except for the anchor portions 6, are separated from the silicon nitride film 4, which is a foundation and are suspended, and thereby a movable structure is formed.

To describe this etching step of the silicon oxide film 19 (sacrificial layer) in greater detail, the substrate is immersed in an etchant and the silicon oxide film 19 (sacrificial layer) is etched, and thereafter the substrate is removed from the etchant. Because etchant adheres to the surface of the substrate in this state, the substrate is immersed in pure water to replace the etchant with pure water, and thereafter the substrate is removed from the pure water and dried. During this drying of the substrate, pure water exists between the movable portion (beam portions 7, weight portion 8, and movable gate electrode portions 9 and 10) and the substrate 1, the pure water becomes droplets due to the progression of drying, and there may be cases where the movable portion (beam portions 7, weight portion 8, and movable gate electrode portions 9 and 10) is pulled toward and adheres to the surface of the substrate 1 due to surface tension of the droplets, and a movable structure cannot be formed. In contrast to this, according to the present embodiment, the above-described adhesion of the movable portion to the substrate surface can be prevented due to the existence of projections for movable-range restriction use 17. This is because, even if a droplet of the foregoing pure water is formed between the movable portion and the substrate surface, the droplet is formed and limited between the projections for movable-range restriction use 17 and the substrate 1 as indicated as W2 in FIG. 20, and moreover this droplet is small.

Furthermore, the size of the droplet (indicated as W2 in FIG. 20) becomes smaller than the size of the droplet (indicated as W1) shown in FIG. 2 due to the rounding of the tips of the projections for movable-range restriction use 17 shown in FIG. 20 in comparison with a case where the bottoms of the projections for movable-range restriction use are flat, as with the first embodiment indicated in FIG. 2.

Accordingly, surface tension of the droplet acting between the movable portion (beam portions 7, weight portion 8, and movable gate electrode portions 9 and 10) and the substrate 1 becomes smaller, and adhesion of the movable portion to the substrate surface can reliably be prevented. Additionally, even if hypothetically the movable portion were to temporarily stick to the surface of the substrate surface, because surface tension of the droplet is small, the movable portion separates from the substrate surface and returns to its original state due to rigidity (restorative strength) of the beams. In this way, a movable structure can easily and reliably be formed.

In this way, according to the present embodiment, the silicon oxide film 19 (sacrificial layer) of substantially uniform thickness is formed on the main surface of the semiconductor substrate (p-type silicon substrate 1, silicon oxide films 2 and 3, and silicon nitride film 4—first step), the resist 20 is formed on the silicon oxide film 19 (second step), the resist 20 is exposed by the exposure equipment having a predetermined resolution employing the photomask 21 (third step), a portion of the silicon oxide film 19 corresponding to a projection formation area is made thinner employing the exposed resist 20 (fourth step), a polysilicon thin film 24 (movable-portion formation film composed of a thin film) is formed on the silicon oxide film 19 (fifth step), and the silicon oxide film 19 below the polysilicon thin film 24 is etched away to form the anchor portions 6, movable portion 5, and projections for movable-range restriction use 17 (sixth step). In the above third step, the photomask 21 has a pattern for anchor-portion formation and projection-portion formation, and the projection-formation region of photomask 21 has a fine pattern which is finer than the resolution of the exposure equipment. Further, the fourth step forms grooves (19a), the bottom-surface side tips of which are sharpened, pointed or rounded in the projection-formation region.

Accordingly, projections for movable-range restriction use can be fabricated with no increase of mask step, a semiconductor sensor can be fabricated with no increase in processes, and machining of a sacrificial layer to fabricate anchor portions and projections with a single photomask is facilitated. Moreover, because tips of the projections are sharpened, pointed or rounded, contact area of the projections and substrate due to droplets during sensor fabrication becomes smaller, the adhesive force of the movable portion and substrate becomes weaker, and adhesion of the movable portion to the substrate can be prevented.

Additionally, because the projection-formation area of the photomask in the third step is such that the quantity of transmitted light gradually becomes larger toward the center of the projection-formation area, desired projection shape can easily be obtained.

Furthermore, because the projections for movable-range restriction use 17 are provided respectively for the four beam portions 7, the projections for movable-range restriction use 17 can reliably be caused to make contact before the movable gate electrode portions 9 and 10 contact the silicon substrate 1 (silicon nitride film 4) even if torsion occurs in the movable portion 5 (beam portions 7).

Still further, because the projections for movable-range restriction use 17 are provided in locations proximate to the weight portion 8 on the beam portions 7 of the movable portion 5, even when excessive acceleration is applied and the weight portion 8 attempts to deform, deformation thereof can be prevented by the projections for movable-range restriction use 17.

Yet further, because the projections for movable-range restriction use 17 are formed so as to cause the thin film of uniform film thickness which makes up the movable portion 5 to deform downwardly, the projections 17 can easily be formed.

(SIXTH EMBODIMENT)

A sixth embodiment will be described next with a focus on points of difference with the fifth embodiment.

Figure 33:
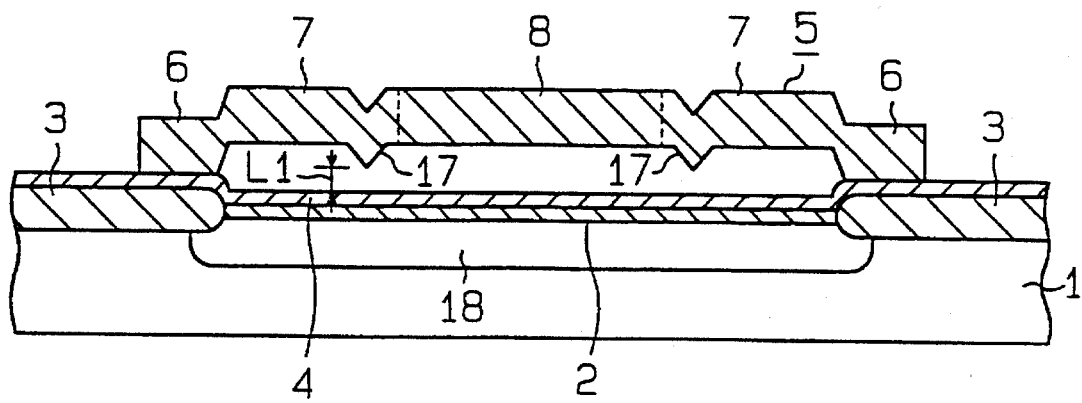
FIG. 33 is an essential sectional view of a semiconductor acceleration sensor according to a sixth embodiment.

According to the fifth embodiment, the tips of the projections for movable-range restriction use 17 were rounded to have a shell type bottom, but according to the sixth embodiment, as shown in FIG. 33, tips of projections for movable-range restriction use 17 are caused to be pointed. That is, projections for movable-range restriction use 17 have a triangle pole shape. A mode of operation and effect similar to that described for the fifth embodiment is demonstrated even when this is done.

Herein, when a case where the tips of the projections for movable-range restriction use 17 have been rounded and a case where the tips of the projections for movable-range restriction use 17 have been caused to be pointed are compared from the standpoint of mechanical strength, it can be said that possibility of damage at a time of contact with the substrate is smaller in the case where the tips have been rounded.

(SEVENTH EMBODIMENT)

A seventh embodiment will be described next with a focus on points of difference with the fifth embodiment.

Figure 34:
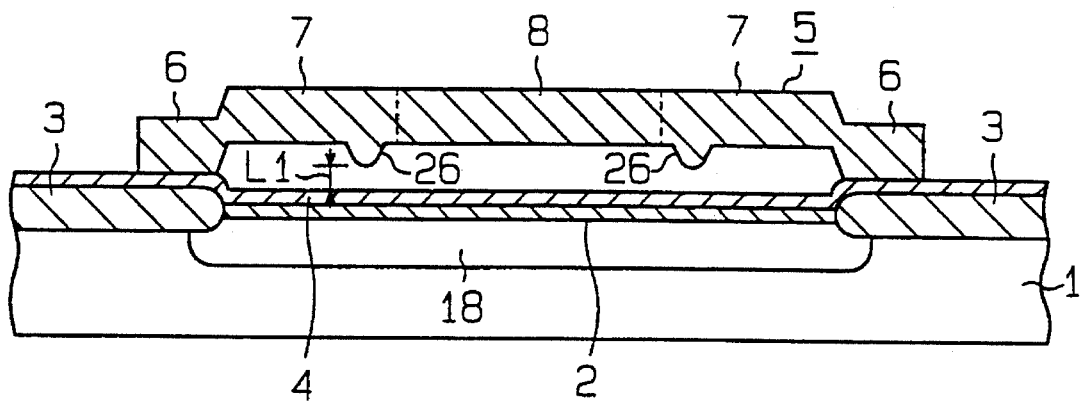
FIG. 34 is an essential sectional view of a semiconductor acceleration sensor according to a seventh embodiment.

FIG. 34 indicates a cross-section of a sensor according to the present embodiment. As shown in FIG. 20, the projections for movable-range restriction use 17 were, in the fifth embodiment, formed by causing the movable portion 5 composed of a polysilicon thin film to be displaced downwardly, such that the projections had the same film thickness as the movable portion 5. In contrast to this, according to the sensor according of the present embodiment, projections for movable-range restriction use 26 are formed by thickening film thickness of a movable portion 5. In this case, a device with favorable shock resistance when excessive acceleration is obtained.

(EIGHTH EMBODIMENT)

An eighth embodiment will be described next with a focus on points of difference with the fifth embodiment.

Figure 35:
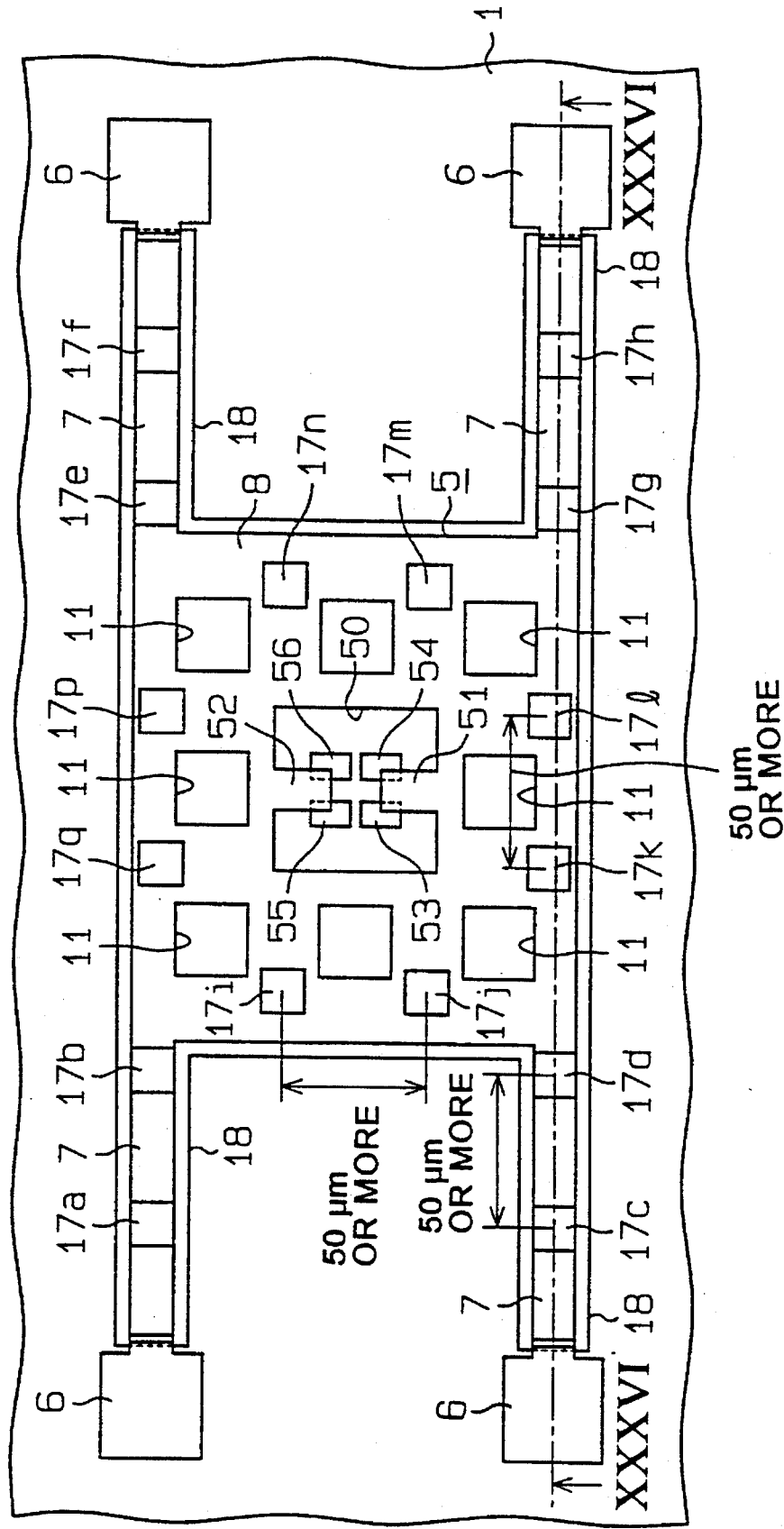
FIG. 35 is a plan view of a semiconductor acceleration sensor according to an eighth embodiment.
Figure 36:
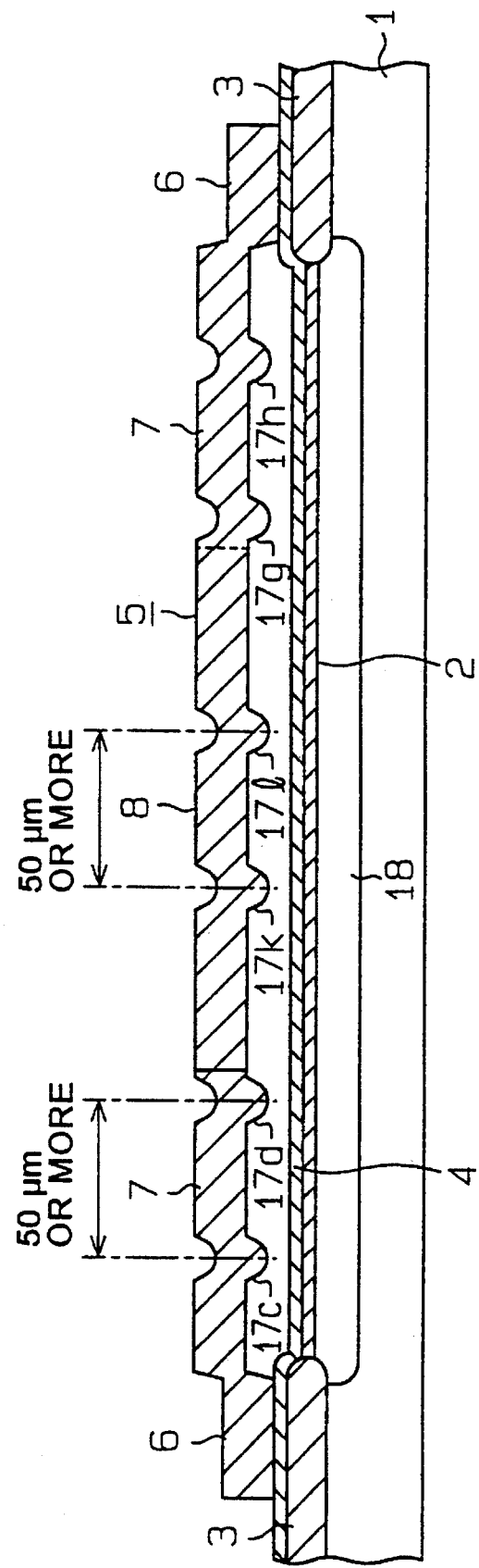
FIG. 36 is a sectional view taken along line XXXVI—XXXVI of FIG. 35.

FIG. 35 indicates a plan view of a sensor according to the present embodiment, and FIG. 36 indicates a sectional view taken along line XXXVI—XXXVI of FIG. 35.

According to the above-described fifth embodiment, one projection for movable-range restriction use 17 was formed on each of the of the four beam portions 7, but according to the present embodiment the arrangement positions and number of projections for movable-range restriction use 17 is changed.

As shown in FIGS. 35 and 36, two each of projections for movable-range restriction use 17a to 17h are disposed separately on respective beam portions 7, and an interval of these several projections for movable-range restriction use 17a to 17h is 50 μm or more. Furthermore, on a weight portion 8 as well, two each of projections for movable-range restriction use 17i to 17q of square configuration are disposed separately on respective sides of the weight portion 8 of square configuration, and an interval of these several projections for movable-range restriction use 17i to 17q also is 50 μm or more. The interval of the projections for movable-range restriction use 17a to 17q is caused to be 50 μm or more to further reduce the sum of the opposing surface area of the projections for movable-range restriction use 17a to 17q and the substrate surface (underlying electrode 18), reduce the sum of surface tension of droplets (replacement fluid for etchant) formed between the projections for movable-range restriction use 17a to 17q and the substrate surface in the sacrificial-layer etching step, and avoid the movable portion being pulled toward and adhering to the substrate surface.

Moreover, in FIGS. 35 and 36, an opening portion (through-hole) 50 is provided in a center of the weight portion 8 with regard to the movable gate electrode portions 9 and 10 and fixed electrodes 12, 13, 14, and 15 as source/drain regions of FIG. 19, and a cantilever-beam type movable gate electrode portion 51 extending in an $X_+$ direction as well as a cantilever-beam type movable gate electrode portion 52 extending in an $X_-$ direction are formed. That is to say, a pair of opposing beam type movable electrode portions 51 and 52 are formed in the opening portion 50. Additionally, fixed electrodes 53, 54, 55, and 56 are formed at positions relative to the cantilever-beam type movable gate electrode portions 51 and 52, similarly to the positional relationship of the transistors in FIG. 19. In this way, the pair of beam type movable gate electrode portions 51 and 52 can be arranged proximately in the center portion of the weight portion 8. As a result thereof, even in a case where, for example, the weight portion 8 has warped, it can be made difficult for the movable gate electrode portions 51 and 52 to contact the substrate in comparison with the case where the movable gate electrode portions 9 and 10 protrude from opposite sides of the weight portion 8 as indicated in FIG. 19, and additionally two transistors can be formed proximately at locations (regions) where the crystalline structure of the substrate is equal, and it becomes possible to attempt uniformity of element characteristics.

As a sample application of the present embodiment, it is acceptable for projections for movable-range restriction use 17 to be formed only on the weight portion 8. In this case, deformation of the weight portion 8 occurs when the surface area of the weight portion 8 has been enlarged to heighten sensitivity, but deformation of the weight portion 8 can be prevented when the projections for movable-range restriction use 17 are provided in respective corners of the weight portion 8. Additionally, it is also acceptable to provide a plurality of projections for movable-range restriction use 17 per one beam portion 7 without providing projections on the weight portion 8.

(NINTH EMBODIMENT)

A ninth embodiment will be described next with a focus on points of difference with the fifth embodiment.

Figure 37:
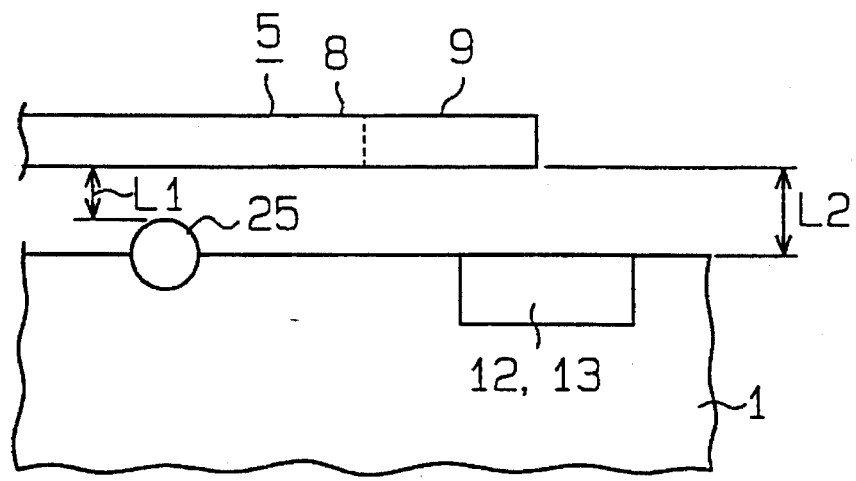
FIG. 37 is an essential sectional view of a semiconductor acceleration sensor according to a ninth embodiment.

FIG. 37 indicates a sectional view of a sensor according to the present embodiment.

According to the foregoing fifth embodiment, the projections for movable-range restriction use 17 were provided on the movable portion 5, but according to the present embodiment, a projection for movable-range restriction use 25 is formed on an upper surface of a p-type silicon substrate 1 (semiconductor substrate). This projection for movable-range restriction use 25 is formed by a LOCOS oxide film, and a tip thereof is rounded.

Figure 38:
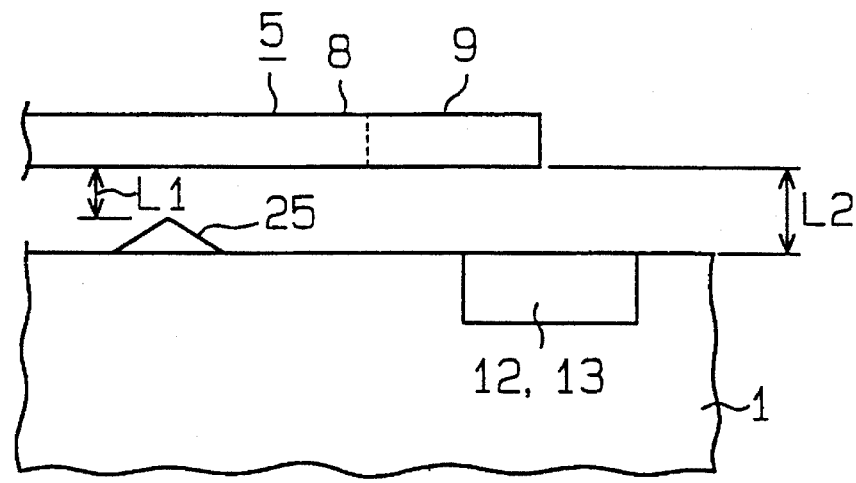
FIG. 38 is an essential sectional view of a semiconductor acceleration sensor of a sample application according to the ninth embodiment.

As a sample application of the present embodiment, it is also acceptable for a tip to protrude pointedly and not be rounded as shown in FIG. 38.

Moreover, it is also acceptable to provide projections for movable-range restriction use also on an upper surface of the p-type silicon substrate 1 (semiconductor substrate) together with providing the projections for movable-range restriction use 17 on the movable portion 5. In this case, it is also acceptable to provide a first projection on the lower surface of the movable portion 5, and together with this, provide a second projection on the upper surface of the substrate to oppose this first projection.

This invention is not exclusively the above-described embodiments; according to the present foregoing embodiments the movable portion 5 was a doubly supported beam structure, but a cantilever beam structure is also acceptable.

Furthermore, it is acceptable for the projections for movable-range restriction use (17 and 25) as movable-range restricting portions to be formed of protruding bands of triangular cross-section, and further conical or pyramidical shape is acceptable.

Still further, embodiment as a semiconductor yaw-rate sensor, vibration sensor, or the like other than a semiconductor acceleration sensor is also acceptable.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A method for fabricating a semiconductor sensor which has a substrate, a movable structure of beam structure provided above said substrate with a first gap interposed therebetween, and a detector for detecting a physical quantity based on a displacement of said movable structure, the method comprising steps of:

forming a sacrificial layer of uniform thickness on a main surface of said substrate;

simultaneously forming on said sacrificial layer a depression at a portion corresponding to a formation area of a projection for movable-range restriction use and an opening reaching through to said main surface of said substrate at a portion corresponding to a formation area of an anchor of said movable structure;

forming on said sacrificial layer a film which becomes said movable structure; and removing said sacrificial layer below said film to make said film said movable structure, whereby a projection for movable-range restriction use to form a second gap narrower than said first gap is formed and said movable structure is suspended on said substrate by said anchor.

2. A method for fabricating a semiconductor sensor according to claim 1, wherein said step of simultaneously forming said depression and said opening includes steps of:

forming a resist on said sacrificial layer;

exposing said resist using a mask having a pattern which allows sufficient exposure to said resist at a region corresponding to a formation area of an anchor of said movable structure and allows insufficient exposure to said resist at a region corresponding to a formation area of a projection for movable-range restriction use;

developing said exposed resist; and etching said sacrificial layer using said developed resist as a mask.

3. A method for fabricating a semiconductor sensor according to claim 2, wherein said resist is a positive resist, and wherein said mask used in said step of exposing said resist includes a first light-passing pattern to allow said positive resist to be sufficiently exposed and a second light-passing pattern to allow said positive resist to be insufficiently exposed.

4. A method for fabricating a semiconductor sensor according to claim 3, wherein said second light-passing pattern of said mask is composed of a plurality of light-passing windows each size of which is not larger than a resolution of an exposure equipment.

5. A method for fabricating a semiconductor sensor according to claim 4, wherein said plurality of light-passing windows are disposed having a distribution, said distribution of said light-passing windows being such that a quantity of transmitted light through said second light-passing pattern gradually increases toward a center of said second light-passing pattern.

6. A method for fabricating a semiconductor sensor according to claim 5, wherein said quantity of transmitted light through said second light-passing pattern has a profile having a uniform maximum value around said center of said second light-passing pattern.

7. A method for fabricating a semiconductor sensor according to claim 5, wherein said quantity of transmitted light through said second light-passing pattern has a profile having a peak at said center of said second light-passing pattern.

8. A method for fabricating a semiconductor sensor according to claim 2, wherein said step of etching said sacrificial layer includes dry-etching said sacrificial layer using said developed resist as a mask.

9. A method for fabricating a semiconductor sensor according to claim 8, wherein said dry-etching of said sacrificial layer is performed using $CF_4$ and $O_2$.

10. A method for fabricating a semiconductor sensor according to claim 8, wherein flow rates and pressures of said $CF_4$ and $O_2$ are controlled so that an etching rate of said sacrificial layer by $CF_4$ and an etching rate of said resist by $O_2$ are substantially equal.

11. A method for fabricating a semiconductor sensor comprising steps of:

depositing a sacrificial film of substantially uniform thickness on a surface of a substrate;

applying a photoresist on said sacrificial film;

exposing said photoresist by an exposure equipment employing a mask, said mask having a light-passing/light-blocking pattern to position at least an anchor-formation position and bump-formation position of a movable portion, and having a pattern which exposes said photoresist at sufficient resist sensitivity with respect to said anchor-formation position and exposes said photoresist at insufficient resist sensitivity with respect to said bump-formation position;

patterning said sacrificial film using said exposed photoresist, whereby an opening of depth corresponding to thickness of said sacrificial film in correspondence with said anchor-formation position and a depression of depth shallower than thickness of said sacrificial film in correspondence with said bump-formation position are simultaneously formed in the sacrificial film;

depositing a movable-portion formation film on said patterned sacrificial film; and etching said sacrificial film, whereby said movable-portion formation film makes up a movable portion suspended at said anchor-formation position so as to be fixed with respect to said substrate, and a bump is provided at said bump-formation position to locally shorten distance between said substrate and said movable portion.

12. A method for fabricating a semiconductor sensor according to claim 11, wherein a positive resist is used as said photoresist.

13. A method for fabricating a semiconductor sensor according to claim 12, wherein said pattern of said mask has a light-passing pattern composed of a light-passing portion to expose with a sufficient irradiation amount with respect to said anchor-formation position and a collection of fine light-passing portions of a resolution of said exposure equipment or less with respect to said bump-formation position.

14. A method for fabricating a semiconductor sensor having a semiconductor substrate, a movable portion of beam structure composed of a thin film provided above said semiconductor substrate with a gap interposed therebetween, which is displaced in accompaniment with action of a physical quantity, and a movable-range restricting portion provided on a lower surface of said movable portion to restrict a quantity of displacement of said movable portion to said semiconductor substrate, said method comprising steps of:

forming a sacrificial layer of substantially uniform thickness on a main surface of a semiconductor substrate;

forming a resist on said sacrificial layer;

exposing said resist with an exposure equipment having a resolution using a photomask;

thinning a portion of said sacrificial layer which corresponds to a formation area of a projection for movable-range restriction use using said exposed resist;

forming a movable-portion formation layer on said remaining sacrificial layer; and etching said sacrificial layer below said movable-portion formation layer to form an anchor portion, movable portion, and projection for movable-range restriction use, wherein said photomask has a pattern for anchor-portion formation and for projection formation, said pattern having a fine pattern finer than a resolution of said exposure equipment at a region of a projection-formation region, and wherein said thinning step is performed so that in a projection-formation region a depression a bottom-surface side tip of which is sharpened, pointed or rounded is formed.

15. A method for fabricating a semiconductor sensor according to claim 14, wherein said fine pattern of said projection-formation region of said photomask is such that a quantity of transmitted light in said projection-formation region gradually increases toward a central side of said projection-formation region.

* * * * *